US012261801B2

(12) United States Patent
Liu et al.

(10) Patent No.: US 12,261,801 B2
(45) Date of Patent: Mar. 25, 2025

(54) COMMUNICATION METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 17/721,495

(22) Filed: Apr. 15, 2022

(65) Prior Publication Data
US 2022/0239443 A1 Jul. 28, 2022

Related U.S. Application Data

(63) Continuation of application No. PCT/CN2020/075423, filed on Feb. 14, 2020.

(30) Foreign Application Priority Data

Oct. 18, 2019 (WO) ................ PCT/CN2019/112002

(51) Int. Cl.
*H04L 5/00* (2006.01)
(52) U.S. Cl.
CPC .................... *H04L 5/0053* (2013.01)
(58) Field of Classification Search
CPC .................................................. H04L 5/0053
See application file for complete search history.

(56) References Cited

U.S. PATENT DOCUMENTS

| | | | |
|---|---|---|---|
| 2019/0053270 A1 | 2/2019 | Akoum et al. | |
| 2019/0222289 A1 | 7/2019 | John Wilson et al. | |
| 2019/0297637 A1 | 9/2019 | Liou et al. | |
| 2020/0196284 A1* | 6/2020 | Wang ................ | H04W 72/23 |
| 2020/0196324 A1 | 6/2020 | Ji et al. | |
| 2021/0250926 A1* | 8/2021 | Shi ................ | H04W 72/23 |

(Continued)

FOREIGN PATENT DOCUMENTS

| | | |
|---|---|---|
| CN | 109392112 A | 2/2019 |
| CN | 110324900 A | 10/2019 |

(Continued)

OTHER PUBLICATIONS

Panasonic, "On multi-TRP enhancements for NR MIMO in Rel. 16," 3GPP TSG RAN WG1 #98bis, R1-1910523, Chongqing, China, Oct. 14-20, 2019, 11 pages.

(Continued)

*Primary Examiner* — Derrick V Rose
(74) *Attorney, Agent, or Firm* — Fish & Richardson P.C.

(57) ABSTRACT

The present disclosure relates to communication methods and apparatus. In one example method, a terminal device receives first indication information, where the first indication information is used to indicate grouping information of N control resource sets in M control resource sets, N is less than M, and N and M are positive integers greater than or equal to 1. The terminal device determines grouping information of K control resource sets other than the N control resource sets in the M control resource sets based on the first indication information.

20 Claims, 19 Drawing Sheets

(56) References Cited

U.S. PATENT DOCUMENTS

2022/0159733 A1\*  5/2022  Cirik ..................... H04L 5/0053
2022/0263630 A1\*  8/2022  Fehrenbach .......... H04L 5/0053

FOREIGN PATENT DOCUMENTS

WO    2019032497 A1    2/2019
WO    2019047156 A1    3/2019

OTHER PUBLICATIONS

PCT International Search Report and Written Opinion issued in International Application No. PCT/CN2019/112002 on Jul. 22, 2020, 14 pages (with English translation).
PCT International Search Report and Written Opinion issued in International Application No. PCT/CN2020/075423 on Jul. 20, 2020, 18 pages (with English translation).
ZTE, "NR PDDCH Coreset Configuration," 3GPP TSG RAN WG1 Meeting #AH_NR2, R1-1710106, Qingdao, China, Jun. 26-30, 2017, 5 pages.
ZTE, "On Multi-PDCCH Design For Multi-TRP," 3GPP TSG RAN WG1 #97, R1-1906242, Reno, USA, May 13-17, 2019, 4 pages.
Extended European Search Report in European Appln No. 20877278.0, dated Nov. 7, 2022, 11 pages.

\* cited by examiner

COMMUNICATION METHOD AND APPARATUS

CROSS-REFERENCE TO RELATED APPLICATION

This application is a continuation of International Application No. PCT/CN2020/075423, filed on Feb. 14, 2020, which claims priority to Chinese Patent Application No. PCT/CN2019/112002, filed on Oct. 18, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a new radio (NR) standard of a fifth generation (5th Generation, 5G) communication system, a downlink transmission resource is divided into a control area and a data area. The control area is used to transmit a control channel, and the data area is used to transmit a data channel. Control information carried on the control channel includes time domain and frequency domain positions of a resource block (RB) used by the data channel in the data area, and the data channel is used to carry downlink data or uplink data.

To improve efficiency of blindly detecting a control channel by a terminal device, a concept of a control resource set (CORESET) is proposed in the NR standard. In other words, one or more control resource sets are allocated to each terminal device in a control area. A base station may send a control channel to the terminal device on any control resource set corresponding to the terminal device, for example, send downlink control information (DCI). To enable the terminal device to separately feed back feedback information of data from different stations to different stations, a CORESET grouping information indication mechanism is introduced in a conventional technology. In some scenarios, in configuration information of a CORESET sent by the base station to user equipment (UE), some grouping information of the CORESET may be defaulted. Therefore, how to ensure consistent understanding of the base station and the UE for the grouping information of the CORESET, so that the base station and the terminal device align sequences for understanding feedback information is a problem that needs to be urgently resolved.

SUMMARY

This application provides a communication method and apparatus. The method is used to enable a network device and terminal device to have consistent understanding for grouping information of a CORESET.

According to a first aspect, an embodiment of this application provides a communication method. The method includes: A terminal device receives first indication information, where the first indication information is used to indicate grouping information of N control resource sets, N is less than M, and N and M are positive integers greater than or equal to 1; and then, the terminal device determines grouping information of K control resource sets other than the N control resource sets in the M control resource sets based on the first indication information, where K is a positive integer greater than or equal to 1.

In this embodiment of this application, the terminal device determines, based on grouping information corresponding to a control resource set whose grouping information is indicated, grouping information corresponding to a control resource set whose grouping information is not indicated. On one hand, signaling overheads can be reduced, and it is ensured that a base station has flexibility of configuring grouping information. On the other hand, it can be ensured that the grouping information determined by the terminal device according to the foregoing method is consistent with that determined on a network side.

In a possible design, the M control resource sets belong to a same carrier or a same BWP. When the grouping information of the N control resource sets is the same, the terminal device determines that the grouping information of the K control resource sets is the same as the grouping information of the N control resource sets. When grouping information of at least two control resource sets in the N control resource sets is different, the terminal device determines that the grouping information of the K control resource sets is the same as grouping information of a first control resource set in the N control resource sets, where the grouping information of the first control resource set is a minimum value or a maximum value in the grouping information of the N control resource sets.

In a possible design, the M control resource sets belong to different carriers. When the grouping information of the N control resource sets is the same, the terminal device determines that the grouping information of the K control resource sets whose grouping information is not indicated is the same as the grouping information of the N control resource sets. When the grouping information of the N control resource sets is different, the terminal device determines that the grouping information of the K control resource sets whose grouping information is not indicated is the same as grouping information of a second control resource set, where the grouping information of the second control resource set is a minimum value or a maximum value in the grouping information of the N control resource sets.

In another possible design, the M control resource sets belong to different carriers. When grouping information of L control resource sets whose grouping information is indicated in a same carrier is the same, the terminal device determines that grouping information of a control resource set whose grouping information is not indicated in the same carrier is the same as the grouping information of the L control resource sets. When grouping information of at least two control resource sets in L control resource sets whose grouping information is indicated in a same carrier is different, the terminal device determines that grouping information of a control resource set whose grouping information is not indicated in the same carrier is the same as grouping information of a second control resource set, where L is a positive integer less than N, the grouping information of the second control resource set is a minimum value or a maximum value in the grouping information of the L control resource sets, and the L control resource sets are some control resource sets in the N control resource sets.

In a possible design, grouping information of the M control resource sets may be one or more of {0, 1}.

In the foregoing embodiment of this application, the terminal device can ensure, according to the foregoing method, that the terminal device and the network device have consistent understanding for grouping information, so that the base station and the terminal device have consistent understanding for a quantity of bits of feedback information, thereby improving transmission reliability and resource utilization efficiency.

In a possible design, the M control resource sets are control resource sets in a carrier configured by using RRC signaling or control resource sets in a carrier indicated and activated by using MAC CE signaling. In other words, the M control resource sets may all be control resource sets in an activated carrier; or some of the M control resource sets are control resource sets in an activated carrier, and the rest of the control resource sets are in an inactivated carrier.

In a possible embodiment, the terminal device receives second indication information, where the second indication information is used to indicate carrier information of the M control resource sets. The method further includes:

The terminal device determines a first quantity of carriers including first grouping information, where the first grouping information is any information in the grouping information of the M control resource sets; and then, terminal device determines, based on the first quantity, a quantity of bits of a downlink assignment index DAI field of DCI carried in U control resource sets corresponding to the first grouping information, where U is less than M, and U and M are positive integers greater than or equal to 1.

In this embodiment of this application, when grouping information of control resource sets is defaulted, the terminal device can still determine, based on grouping information and carrier information of some or all of the control resource sets, a quantity of bits of a DAI field of DCI carried in the control resource sets, to ensure that the terminal device and the network device have consistent understanding for the quantity of bits of the DAI, thereby improving transmission reliability. The terminal device determines, only based on a quantity of carriers including same grouping information, a quantity of bits of DCI carried in a control resource set under the grouping information, thereby reducing DCI overheads.

In a possible embodiment, the first indication information and the second indication information may be carried in a same message or different messages.

In a possible embodiment, when the first quantity is greater than 1, the terminal device determines that the quantity of bits of the DAI field of the DCI carried in the U control resource sets is a first value; or when the first quantity is equal to 1, the terminal device determines that the quantity of bits of the DAI field of the DCI carried in the U control resource sets is a second value, where the first value is greater than the second value. For example, when a quantity of carriers including the first grouping information is 2, the terminal device determines that a quantity of bits of a total DAI field of DCI carried in a control resource set corresponding to the first grouping information is 2; or when a quantity of carriers including the first grouping information is 1, the terminal device determines that a quantity of bits of a total DAI field of DCI carried in a control resource set corresponding to the first grouping information is 0.

In a possible embodiment, the terminal device determines, based on the DAI, a quantity of bits of downlink data feedback information and a bit position of each piece of downlink data feedback information in a feedback information sequence. Specifically, the DAI may include a counter DAI. When the quantity of carriers is greater than 1, the DAI may further include a total DAI. The counter DAI is used to indicate an arrangement order of the DCI, so as to indicate a bit position of data scheduled by the DCI in the feedback information sequence. The total DAI is used to indicate an amount of DCI corresponding to currently existing to-be-fed-back data, so as to indicate a quantity of bits of the feedback information sequence.

In a possible embodiment, the terminal device detects, based on the quantity of bits of the DAI field of the DCI carried in the U control resource sets corresponding to the first grouping information, the DCI carried in the U control resource sets.

In a possible embodiment, the terminal device sends first feedback information of first downlink data, where the first downlink data is scheduled by DCI carried in at least one of the U control resource sets.

In a possible embodiment, the terminal device generates a first feedback information sequence based on DCI carried in at least one of the U control resource sets.

The terminal device determines, only based on a quantity of carriers including same grouping information, a quantity of bits of DCI carried in a control resource set under the grouping information, thereby reducing DCI overheads.

In a possible embodiment, the terminal device determines, based on the grouping information and the carrier information of the M control resource sets, a second quantity of carriers including second grouping information, where the second grouping information is any information in the grouping information of the M control resource sets, and the second grouping information is different from the first grouping information. The terminal device determines, based on the second quantity, a quantity of bits of a downlink assignment index DAI field of DCI carried in V control resource sets corresponding to the second grouping information, where V is less than M, and V is a positive integer greater than or equal to 1. The terminal device detects, based on the quantity of bits of the DAI field of the DCI carried in the V control resource sets corresponding to the second grouping information, the DCI carried in the V control resource sets.

In a possible embodiment, an uplink feedback resource of downlink data scheduled by the DCI carried in the U control resource sets is different from an uplink feedback resource of downlink data scheduled by the DCI carried in the V control resource sets in a same time unit.

In a possible embodiment, the terminal device sends second feedback information of second downlink data, where the second downlink data is scheduled by at least one piece of DCI carried in the V control resource sets.

In a possible embodiment, the first feedback information and the second feedback information are respectively carried on different uplink resources in a same time unit. Specifically, in one slot, the first feedback information and the second feedback information may be carried on two time division or frequency division PUCCH resources in the same slot.

In a possible embodiment, the terminal device determines HARQ-ACK feedback information corresponding to downlink data scheduled by DCI carried in control resource sets configured with same grouping information, generates a HARQ-ACK sequence, and determines an uplink resource occupied by the sequence. In addition, the terminal device separately generates HARQ-ACK sequences for HARQ-ACK feedback information corresponding to DCI carried in control resource sets configured with different grouping information, and determines an uplink resource occupied by each HARQ-ACK sequence.

According to a second aspect, an embodiment of this application provides a communication method. The method includes: A terminal device receives configuration information of M control resource sets that is sent by a network device, where the configuration information includes carrier information of the M control resource sets and grouping information of some or all of the control resource sets; and the terminal device determines grouping information and the carrier information of the M control resource sets based on the configuration information. The terminal device determines, based on the grouping information and the carrier information of some or all of the M control resource sets, a first quantity of carriers including first grouping information, where the first grouping information is any information in the grouping information of the M control resource sets. Then, the terminal device determines, based on the first quantity, a quantity of bits of a downlink assignment index DAI field of DCI carried in U control resource sets corresponding to the first grouping information, where U is less than M, and U and M are positive integers greater than or equal to 1.

In this embodiment of this application, the terminal device determines, only based on a quantity of carriers including same grouping information, a quantity of bits of DCI carried in a control resource set under the grouping information, thereby reducing DCI overheads. In addition, when grouping information of some control resource sets is defaulted, the terminal device can still determine a quantity of bits of a DAI field of DCI carried in a control resource set corresponding to each piece of grouping information, to ensure that the terminal device and the network device have consistent understanding for the quantity of bits of the DAI, thereby improving transmission reliability.

In a possible embodiment, when the first quantity is greater than 1, the terminal device determines that the quantity of bits of the DAI field of the DCI carried in the U control resource sets is a first value; or when the first quantity is equal to 1, the terminal device determines that the quantity of bits of the DAI field of the DCI carried in the U control resource sets is a second value, where the first value is greater than the second value. For example, when the first quantity is 2, the terminal device determines that a quantity of bits of a total DAI field of DCI carried in a control resource set corresponding to the first grouping information is 2; or when the first quantity is 1, the terminal device determines that a quantity of bits of a total DAI field of DCI carried in a control resource set corresponding to the first grouping information is 0.

In a possible embodiment, the terminal device determines, based on the DAI, a quantity of bits of downlink data feedback information and a bit position of each piece of downlink data feedback information in a feedback information sequence. Specifically, the DAI may include a counter DAI. When the quantity of carriers is greater than 1, the DAI may further include a total DAI. The counter DAI is used to indicate an arrangement order of the DCI, so as to indicate a bit position of data scheduled by the DCI in the feedback information sequence. The total DAI is used to indicate an amount of DCI corresponding to currently existing to-be-fed-back data, so as to indicate a quantity of bits of the feedback information sequence.

In a possible embodiment, the terminal device detects, based on the quantity of bits of the DAI field of the DCI carried in the U control resource sets corresponding to the first grouping information, at least one piece of DCI carried in the U control resource sets.

In a possible embodiment, the terminal device sends first feedback information of first downlink data, where the first downlink data is scheduled by DCI carried in at least one of the U control resource sets.

In a possible embodiment, the terminal device generates a first feedback information sequence based on the DCI carried in the U control resource sets.

The terminal device determines, based on a quantity of carriers including same grouping information, a quantity of bits of DCI carried in a control resource set under the grouping information, thereby reducing DCI overheads.

In a possible embodiment, the terminal device determines a second quantity of carriers including second grouping information, where the second grouping information is any information, other than the first grouping information, in the grouping information of the M control resource sets. The terminal device determines, based on the second quantity, a quantity of bits of a downlink assignment index DAI field of DCI carried in V control resource sets corresponding to the second grouping information, where V is less than M, and V is a positive integer greater than or equal to 1. The terminal device detects, based on the quantity of bits of the DAI field of the DCI carried in the V control resource sets corresponding to the second grouping information, at least one piece of DCI carried in the V control resource sets.

In a possible embodiment, an uplink feedback resource of downlink data scheduled by the DCI carried in the U control resource sets is different from an uplink feedback resource of downlink data scheduled by the DCI carried in the V control resource sets in a same time unit.

In a possible embodiment, the terminal device sends second feedback information of second downlink data, where the second downlink data is scheduled by the DCI carried in the V control resource sets, and the first feedback information and the second feedback information are respectively carried on different uplink resources in a same time unit. Specifically, in one slot, the first feedback information and the second feedback information may be carried on different PUCCH resources.

In a possible embodiment, the terminal device determines HARQ-ACK feedback information corresponding to downlink data scheduled by DCI carried in control resource sets configured with same grouping information, generates a HARQ-ACK sequence, and determines an uplink resource occupied by the sequence. In addition, the terminal device separately generates HARQ-ACK sequences for HARQ-ACK feedback information corresponding to DCI carried in control resource sets configured with different grouping information, and determines an uplink resource occupied by each HARQ-ACK sequence.

According to a third aspect, an embodiment of this application provides a communication method. The method includes: A network device determines M control resource sets; and the network device sends first indication information to a terminal device, where the first indication information includes grouping information of N control resource sets in the M control resource sets, N is less than M, N and M are positive integers greater than or equal to 1, and the grouping information of the N control resource sets is related to grouping information of K control resource sets other than the N control resource sets in the M control resource sets.

In this embodiment of this application, the network device adds grouping information of some control resource sets to configuration information. On one hand, signaling overheads can be reduced. On the other hand, because the grouping information of the N control resource sets is related to the grouping information of the K control resource sets, it can be ensured that the terminal device and the network side have consistent understanding for grouping information.

In a possible embodiment, when the grouping information of the N control resource sets is the same, the grouping information of the N control resource sets is the same as the grouping information of the K control resource sets. When grouping information of at least two control resource sets in the N control resource sets is different, grouping information of a first control resource set in the N control resource sets is the same as the grouping information of the K control resource sets, where the grouping information of the first control resource set is a minimum value or a maximum value in the grouping information of the N control resource sets.

In a possible embodiment, the M control resource sets belong to a same carrier or a same BWP.

In a possible embodiment, when L control resource sets whose grouping information is indicated in a same carrier have same grouping information, the grouping information of the L control resource sets is the same as grouping information of a control resource set whose grouping information is not indicated in the same carrier; or when grouping information of at least two control resource sets in L control resource sets whose grouping information is indicated in a same carrier is different, grouping information of a second control resource set in the L control resource sets is the same as grouping information of a control resource set whose grouping information is not indicated in the same carrier, where L is less than N, and the grouping information of the second control resource set is a minimum value or a maximum value in the grouping information of the L control resource sets.

In the foregoing embodiment of this application, the terminal device can ensure, according to the foregoing method, that the terminal device and the network device have consistent understanding for grouping information, so that subsequent DCI detection robustness can be increased.

In a possible design, the M control resource sets are control resource sets in a carrier configured by using RRC signaling or MAC CE signaling. In other words, the M control resource sets may all be activated control resource sets, or some of the M control resource sets are activated control resource sets.

In a possible embodiment, the method further includes:

The network device determines a first quantity of carriers including first grouping information, where the first grouping information is any information in the grouping information of the M control resource sets, and the first quantity is associated with grouping information and carrier information of a control resource set.

The network device determines, based on the first quantity, a quantity of bits of a downlink assignment index DAI field of DCI carried in U control resource sets corresponding to the first grouping information, where U is less than M, and U and M are positive integers greater than or equal to 1.

In a possible embodiment, the network device sends the DCI in one or more of the U control resource sets based on the quantity of bits of the DAI field of the DCI carried in the U control resource sets.

In this embodiment of this application, the network device determines the quantity of bits of the DAI field of the DCI carried in the control resource set. The first quantity is associated with the grouping information and the carrier information of the control resource set, to ensure that the terminal device and the network device have consistent understanding for the quantity of bits of the DAI, thereby improving transmission reliability.

In a possible embodiment, the network device sends second indication information, where the second indication information is used to indicate carrier information of the M control resource sets. The carrier information may be used to indicate the first quantity, or may be used to indicate the terminal device to determine the first quantity.

In a possible embodiment, the first indication information and the second indication information may be carried in a same message or different messages.

In a possible embodiment, when the first quantity is greater than 1, the network device determines that the quantity of bits of the DAI field of the DCI carried in the U control resource sets is a first value; or when the first quantity is equal to 1, the network device determines that the quantity of bits of the DAI field of the DCI carried in the U control resource sets is a second value, where the first value is greater than the second value. For example, when the first quantity is 2, the terminal device determines that a quantity of bits of a total DAI field is 2; or when the first quantity is 1, the terminal device determines that a quantity of bits of a total DAI field is 0.

According to a fourth aspect, an embodiment of this application provides a communication method. The method includes: A network device determines M control resource sets; and the network device determines, based on grouping information and carrier information of some or all of the M control resource sets, a first quantity of carriers including first grouping information, where the first grouping information is any information in the grouping information of the M control resource sets.

Then, the network device determines, based on the first quantity, a quantity of bits of a downlink assignment index DAI field of DCI carried in U control resource sets corresponding to the first grouping information, where U is less than M, and U and M are positive integers greater than or equal to 1.

In this embodiment of this application, the network device determines that a quantity of bits of a DAI field of DCI carried in a control resource set is associated with grouping information and carrier information of the control resource set, to ensure that a terminal device and the network device have consistent understanding for a quantity of bits of a DAI, thereby improving transmission reliability. In addition, DCI corresponding to grouping information includes a total DAI only when a quantity of carriers including the same grouping information is greater than 1, so that DCI overheads are reduced.

In a possible embodiment, when the first quantity is greater than 1, the network device determines that the quantity of bits of the DAI field of the DCI carried in the U control resource sets is a first value; or when the first quantity is equal to 1, the network device determines that the quantity of bits of the DAI field of the DCI carried in the U control resource sets is a second value, where the first value is greater than the second value. For example, when the first quantity is 2, the terminal device determines that a quantity of bits of a total DAI field is 2; or when the first quantity is 1, the terminal device determines that a quantity of bits of a total DAI field is 0.

In a possible embodiment, the network device sends the DCI in one or more of the U control resource sets based on the quantity of bits of the DAI field of the DCI carried in the U control resource sets.

According to a fifth aspect, an embodiment of this application provides a communication method. The method includes: A terminal device receives HARQ-ACK feedback mode indication information, used to indicate that a HARQ-ACK feedback mode of the terminal device is a joint feedback. The joint feedback means that HARQ-ACK bits corresponding to DCI received on control resource sets with different grouping information are carried on a same PUCCH resource. The terminal device determines a quantity of bits of a total DAI field of DCI based on the HARQ-ACK feedback mode indication information. Further, the terminal device receives the DCI based on the quantity of bits of the total DAI field.

In this embodiment of this application, the terminal device determines, based on the joint feedback mode indicated by the feedback mode indication information, that the total DAI field exists. Therefore, when grouping information is configured, reliability of a HARQ-ACK feedback can be ensured by using total DAI indication information.

In a possible design, the terminal device further receives first indication information and second indication information, where the first indication information is used to indicate grouping information of N control resource sets, N is a positive integer greater than or equal to 1, the second indication information is used to indicate quantity information of a first carrier, and the N control resource sets are in the first carrier.

The terminal device determines, based on the first indication information, the second indication information, and the HARQ-ACK feedback mode indication information, a quantity of bits of a total DAI field of DCI carried in any one of the N control resource sets. The terminal device receives the DCI based on the quantity of bits of the total DAI field.

In this embodiment of this application, when a control resource set is configured with grouping information, even if a quantity of carriers is configured as 1, the DCI still includes the total DAI field, to ensure reliability of a HARQ-ACK feedback and improve transmission performance.

In a possible design, the N control resource sets belong to a same carrier and at least one of the N control resource sets is configured with grouping information. In this case, the DCI has the total DAI field.

In another possible design, the N control resource sets belong to different carriers. In this case, the DCI has the total DAI field.

In a possible design, grouping information is used to indicate one or two of integers 0 and 1, and the grouping information is used to determine HARQ-ACK feedback information corresponding to DCI received on a corresponding control resource set.

In a possible design, the terminal device independently generates a HARQ-ACK bit sequence based on DCI received on control resource sets configured with same grouping information.

In a possible design, the first indication information, the second indication information, and the HARQ-ACK feedback mode indication information may be indicated by using RRC signaling.

In a possible embodiment, the terminal device determines, based on the DAI, a quantity of bits of downlink data feedback information and a bit position of each piece of downlink data feedback information in a feedback information sequence. Specifically, the DAI may include a counter DAI. When the quantity of carriers is greater than 1, the DAI may further include a total DAI. The counter DAI is used to indicate an arrangement order of the DCI, so as to indicate a bit position of data scheduled by the DCI in the feedback information sequence. The total DAI is used to indicate an amount of DCI corresponding to currently existing to-be-fed-back data, so as to indicate a quantity of bits of the feedback information sequence.

In a possible embodiment, the terminal device determines an offset of a transmit power of an uplink signal based on the first indication information, the second indication information, and the HARQ-ACK feedback mode indication information; and the terminal device sends the uplink signal based on the offset of the transmit power.

In a possible embodiment, that the terminal device determines an offset of a transmit power of an uplink signal based on the first indication information, the second indication information, and the HARQ-ACK feedback mode indication information is specifically: When the HARQ-ACK feedback mode of the terminal device is a joint feedback, the terminal device determines, based on the first indication information and the second indication information, a quantity of bits of HARQ-ACKs corresponding to the DCI carried in the N control resource sets, where the HARQ-ACKs are carried on a same uplink channel, for example, a PUSCH or a PUCCH; and determines the offset or an adjustment value of the transmit power of the uplink signal based on the quantity of bits of the HARQ-ACKs.

In a possible embodiment, the uplink signal may be a PUCCH carrying a HARQ-ACK.

According to a sixth aspect, an embodiment of this application provides a communication method. The method includes: A network device sends hybrid automatic repeat request-acknowledgment HARQ-ACK feedback mode indication information, used to indicate that a HARQ-ACK feedback mode of a terminal device is a joint feedback. The joint feedback means that HARQ-ACK bits corresponding to DCI sent on control resource sets with different grouping information are carried on a same PUCCH resource. The network device determines a quantity of bits of a total DAI field of DCI based on the HARQ-ACK feedback mode indication information. Further, the network device sends the DCI based on the quantity of bits of the total DAI field.

In this embodiment of this application, the terminal device determines, based on the joint feedback mode indicated by the feedback mode indication information, that the total DAI field exists. Therefore, when grouping information is configured, reliability of a HARQ-ACK feedback can be ensured by using total DAI indication information.

In a possible design, the network device further sends first indication information and second indication information to the terminal device, where the first indication information is used to indicate grouping information of N control resource sets, N is a positive integer greater than or equal to 1, the second indication information is used to indicate quantity information of a first carrier, and the N control resource sets are in the first carrier. The network device determines, based on the first indication information, the second indication information, and the HARQ-ACK feedback mode indication information, a quantity of bits of a total DAI field of DCI carried in any one of the N control resource sets. The network device sends the DCI based on the quantity of bits of the total DAI field.

In this embodiment of this application, when a control resource set is configured with grouping information, even if a quantity of carriers is configured as 1, the DCI still includes the total DAI field, to ensure reliability of a HARQ-ACK feedback and improve transmission performance.

In a possible design, the N control resource sets belong to a same carrier and at least one of the N control resource sets is configured with grouping information. In this case, the DCI has the total DAI field.

In another possible design, the N control resource sets belong to different carriers. In this case, the DCI has the total DAI field.

In a possible design, grouping information is used to indicate one or more of integers 0 and 1, and the grouping information is used to determine HARQ-ACK feedback information corresponding to DCI delivered on a corresponding control resource set.

In a possible design, the network device determines a HARQ-ACK bit sequence based on information corresponding to DCI sent on control resource sets configured with same grouping information.

In a possible design, the network device determines information, where the information is sent to the terminal device by using DCI; and determines a HARQ-ACK bit sequence based on the information. In a possible design, the first indication information, the second indication information, third indication information, and the HARQ-ACK feedback mode indication information may be indicated by using RRC signaling.

In a possible embodiment, the network device determines, based on the DAI, a quantity of bits of downlink data feedback information and a bit position of each piece of downlink data feedback information in a feedback information sequence. Specifically, the DAI may include a counter DAI. When the quantity of carriers is greater than 1, the DAI may further include a total DAI. The counter DAI is used to indicate an arrangement order of the DCI, so as to indicate a bit position of data scheduled by the DCI in the feedback information sequence. The total DAI is used to indicate an amount of DCI corresponding to currently existing to-be-fed-back data, so as to indicate a quantity of bits of the feedback information sequence.

In a possible embodiment, the network device determines the offset of the transmit power of the uplink signal based on the first indication information, the second indication information, and the HARQ-ACK feedback mode indication information.

In a possible embodiment, when the HARQ-ACK feedback mode of the terminal device is joint feedback, that the network device determines the offset of the transmit power of the uplink signal based on the first indication information, the second indication information, and the HARQ-ACK feedback mode indication information is specifically: The network device determines a quantity of bits of a HARQ-ACK based on the first indication information and the second indication information, and determines the offset or an adjustment value of the transmit power of the uplink signal based on the quantity of bits of the HARQ-ACK.

In a possible embodiment, the network device sends the uplink signal based on the offset of the transmit power of the uplink signal.

In a possible embodiment, the uplink signal may be a PUCCH carrying a HARQ-ACK.

According to a seventh aspect, an embodiment of this application provides a communication apparatus. The communication apparatus includes a processor. The processor is coupled to a memory, and the memory is configured to store instructions. The processor is configured to execute the instructions stored in the memory to perform the method according to any one of the first aspect or the possible designs of the first aspect or the method according to any one of the fifth aspect or the possible designs of the fifth aspect. Optionally, the communication apparatus may further include the memory. Optionally, the communication apparatus may further include a transceiver, configured to support the communication apparatus in sending and/or receiving information in the foregoing method. Optionally, the communication apparatus may be a terminal device, or may be an apparatus in the terminal device, for example, a chip or a chip system. The chip system includes at least one chip, and the chip system may further include another circuit structure and/or a discrete device.

According to an eighth aspect, a communication apparatus is provided. The apparatus may be a terminal device, an apparatus in the terminal device, or an apparatus that can be used together with the terminal device. In a design, the apparatus may include modules for performing the methods/operations/steps/actions described in the first aspect, the second aspect, or the fifth aspect. The modules may be hardware circuits, or may be software, or may be implemented by hardware circuits in combination with software. For example, the apparatus may include a transceiver module and a processing module, and the transceiver module and the processing module may perform corresponding functions in any design example of the first aspect, the second aspect, or the fifth aspect. For functions of the transceiver module and the processing module, refer to the description of the first aspect or the second aspect. Details are not described herein again.

According to a ninth aspect, a communication apparatus is provided. The apparatus may be a network device, an apparatus in the network device, or an apparatus that can be used together with the network device. In a design, the apparatus may include modules for performing the methods/operations/steps/actions described in the third aspect, the fourth aspect, or the sixth aspect. The modules may be hardware circuits, or may be software, or may be implemented by hardware circuits in combination with software. For example, the apparatus may include a transceiver module, and the transceiver module is configured to perform a corresponding function in any design example of the third aspect, the fourth aspect, or the sixth aspect. For specific functions of the processing module and the transceiver module, refer to the description of the third aspect, the fourth aspect, or the sixth aspect. Details are not described herein again.

According to a tenth aspect, an embodiment of this application further provides a computer-readable storage medium, including instructions. When the computer-readable storage medium is run on a computer, the computer is enabled to perform the method according to any one of the first aspect or the possible designs of the first aspect, any one of the second aspect or the possible designs of the second aspect, any one of the third aspect or the possible designs of the third aspect, any one of the fourth aspect or the possible designs of the fourth aspect, any one of the fifth aspect or the possible designs of the fifth aspect, or any one of the sixth aspect or the possible designs of the sixth aspect.

According to an eleventh aspect, an embodiment of this application further provides a chip system. The chip system includes a processor, and may further include a memory, to implement the method according to any one of the first aspect or the possible designs of the first aspect, any one of the second aspect or the possible designs of the second aspect, any one of the third aspect or the possible designs of the third aspect, any one of the fourth aspect or the possible designs of the fourth aspect, any one of the fifth aspect or the possible designs of the fifth aspect, or any one of the sixth aspect or the possible designs of the sixth aspect. The chip system may include a chip, or may include a chip and another discrete device.

According to a twelfth aspect, an embodiment of this application further provides a computer program product, including instructions. When the computer program product runs on a computer, the computer is enabled to perform the method according to any one of the first aspect or the possible designs of the first aspect, any one of the second aspect or the possible designs of the second aspect, any one of the third aspect or the possible designs of the third aspect, any one of the fourth aspect or the possible designs of the fourth aspect, any one of the fifth aspect or the possible designs of the fifth aspect, or any one of the sixth aspect or the possible designs of the sixth aspect.

According to a thirteenth aspect, an embodiment of this application provides a system. The system includes the apparatus according to the seventh aspect or the apparatuses according to the eighth aspect and the ninth aspect.

DESCRIPTION OF EMBODIMENTS

Figure 1A:
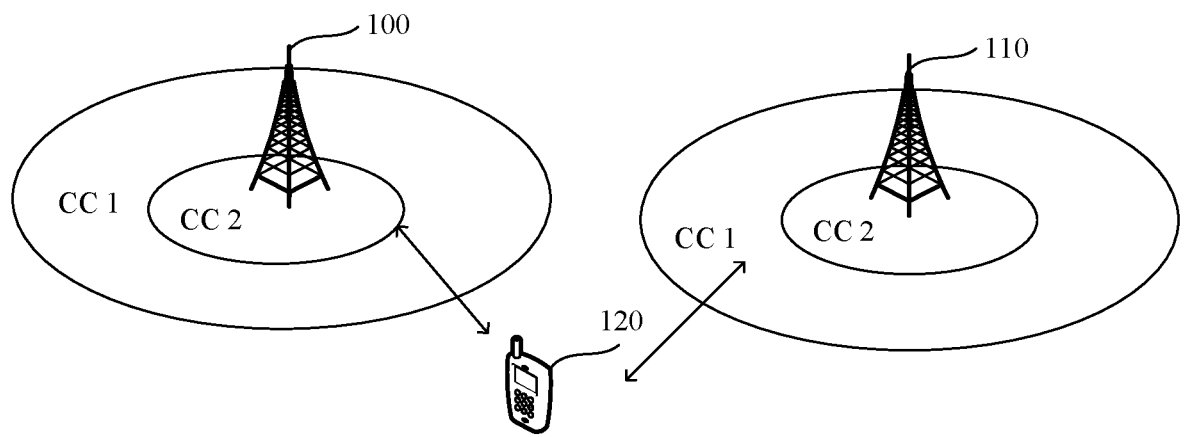
FIG. 1A and FIG. 1B are schematic diagrams of communication scenarios to which an embodiment of this application is applicable.

The following describes technical solutions in embodiments of this application with reference to the accompanying drawings in embodiments of this application.

The technical solutions in embodiments of this application may be applied to various communication systems, for example, a long term evolution (LTE) system, a worldwide interoperability for microwave access (WiMAX) communication system, a future fifth generation (5th Generation, 5G) system such as an NR system, and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, one of information, signal, message, or channel may be used sometimes. It should be noted that meanings expressed by the terms are consistent when differences between the terms are not emphasized. "Of", "corresponding, relevant", and "corresponding" may be interchangeably used sometimes. It should be noted that meanings expressed by the terms are consistent when differences between the terms are not emphasized.

It should be understood that the character "/" herein usually indicates an "or" relationship between associated objects, but may also indicate an "and/or" relationship. For details, refer to the following context for understanding.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Embodiments of this application may be applied to a time division duplex (TDD) scenario, or may be applied to a frequency division duplex (FDD) scenario.

Embodiments of this application may be applied to a conventional typical network or a future UE-centric network. A non-cell network architecture is introduced to the UE-centric network. To be specific, a large quantity of small cells are deployed in a specific area to form a hyper cell, and each small cell is a transmission point (TP) or a TRP of the hyper cell, and is connected to a centralized controller. When the UE moves in the hyper cell, a network side device selects a new sub-cluster for the UE in real time to serve the UE, to avoid a real cell handover, and implement UE service continuity. The network side device includes a radio network device.

In embodiments of this application, an NR network scenario in a wireless communication network is used to describe some scenarios. It should be noted that the solutions in embodiments of this application may be further applied to another wireless communication network, and a corresponding name may also be replaced with a name of a corresponding function in the another wireless communication network.

For ease of understanding embodiments of this application, a communication system shown in FIG. 1A is first used as an example to describe in detail a communication system applicable to embodiments of this application. FIG. 1A is a schematic diagram of a communication system applicable to a communication method according to an embodiment of this application. To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more.

FIG. 1A is a schematic diagram of a network architecture in a carrier aggregation scenario to this application is applicable. The network architecture includes a first network device 100, a second network device 110, a terminal device 120, and two downlink carrier units: a CC 1 and a CC 2. CCs 1 and CCs 2 of the first network device 100 and the second network device 110 operate at different frequencies.

The terminal device 120 may be a wireless terminal device that can receive scheduling and indication information of a network device. The wireless terminal device may be a device that provides a user with voice and/or data connectivity, a handheld device with a wireless connection function, or another processing device connected to a wireless modem. The network device (for example, a macro base station) 100 is an entity configured to transmit or receive a signal on a network side. The network device may be a device configured to communicate with a mobile device.

In addition, in embodiments of this application, the network device serves a cell, and the terminal device communicates with the network device by using a communication resource (for example, a frequency domain resource, namely, a spectrum resource) used for the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have features of small coverage and low transmit power, and are applicable to providing a high-rate data transmission service. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as the network device.

Figure 1B:
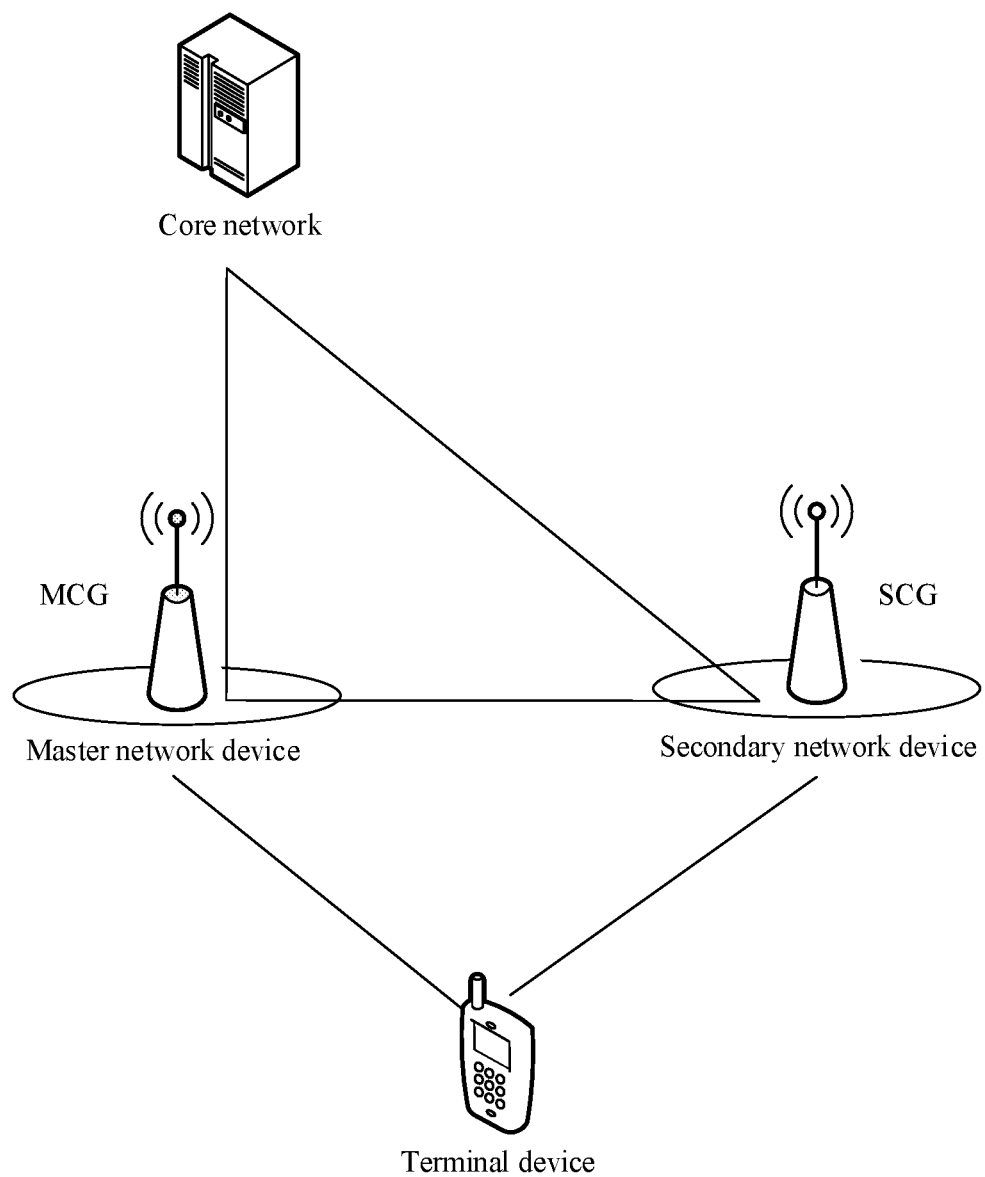

FIG. 1B is a schematic diagram of a network architecture in a dual-connectivity (DC) scenario to which this application is applicable. The architecture includes two cell groups: a master cell group (MCG) and a secondary cell group (SCG). The MCG includes one primary cell (PCell) or additionally includes one or more secondary cells (SCells). The SCG includes one primary secondary cell (PSCell) or additionally includes one or more SCells. A network device managing the MCG is referred to as a master network device or a master node, and a network device managing the SCG is referred to as a secondary network device or a secondary node.

In a 5G network deployment process, a 5G cell may be used as a macro coverage network (as a master network device) or a small cell (as a secondary network device) to enhance coverage and a capacity of an existing LTE network. Regardless of a networking mode, a dual connectivity technology can be used to interconnect LTE and a 5G system. This improves radio resource utilization of an entire mobile network system, reduces a system handover delay, and improves user and system performance.

In embodiments of this application, the master network device may be one of an LTE network device (such as an eNB), a 5G network device (such as a gNB), or a future communication network device. The secondary network device may also be one of an LTE network device, a 5G network device, or a future communication network device. In addition, the master network device and the secondary network device may be network devices of a same standard, for example, are both eNBs; or may be network devices of different standards. For example, the master network device is an eNB, and the secondary network device is a gNB. Communication standards of the master network device and the secondary network device are not limited in this application.

It should be understood that FIG. 1A and FIG. 1B are merely examples of simplified schematic diagrams for ease of understanding. The communication system may further include another network device or another terminal device, which is not illustrated in FIG. 1A and FIG. 1B.

The network architecture and the service scenario that are described in embodiments of this application are intended to describe the technical solutions in embodiments of this application, and do not constitute a limitation on the technical solutions provided in embodiments of this application. A person of ordinary skill in the art may know that, with the evolution of the network architecture and the emergence of the new service scenarios, the technical solutions provided in embodiments of this application are also applicable to similar technical problems.

The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of the new service scenarios, the technical solutions provided in embodiments of this application are also applicable to similar technical problems.

The following describes some terms in embodiments of this application, to facilitate understanding of a person skilled in the art.

(1) A terminal device includes a device that provides a user with voice and/or data connectivity, for example, may include a handheld device with a wireless connection function or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a V2X terminal device, a machine-to-machine/machine-type communication (machine-to-machine/machine-type communications, M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may include a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (OBUs).

(2) A network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to mutually convert a received over-the-air frame and an internet protocol (IP) packet, and serve as a router between the terminal device and other parts of the access network, where the other parts of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB or eNB or e-NodeB, evolutional Node B) in an LTE system or long term evolution-advanced (LTE-A), may include a next generation NodeB (gNB) in a 5th-generation mobile communication technology (the 5th generation, 5G) new radio (NR) system, or may include a centralized unit (CU) and a distributed unit (DU) in a cloud access network (cloud radio access network, Cloud RAN) system. This is not limited in embodiments of this application.

(3) A downlink control channel is, for example, a PDCCH, an enhanced physical downlink control channel (PDCCH), or another downlink control channel, and is not specifically limited.

(4) A CORESET is a physical resource configured to carry a PDCCH or DCI. Generally, each CORESET corresponds to a group of parameters, and the parameters may include: an index number of the CORESET, a quantity of consecutive OFDM symbols occupied by the CORESET, and a group of resource blocks (resource block, RB) occupied by the CORESET. A Quasi-co-location (QCL) of a demodulated reference signal (DMRS) of the CORESET is assumed to be used to receive a parameter such as an auxiliary signal. In addition, each CORESET is associated with one or more PDCCH candidates. It may be understood that the terminal device performs one DCI detection operation on each candidate PDCCH. Generally, one DCI detection operation is performed on some physical resources in the CORESET. A configuration of the CORESET may be delivered by using RRC signaling, where in this case, the CORESET may be considered as a user-specific control resource set; or may be delivered by using a system message or a broadcast message, for example, is delivered by using an SIB, where in this case, the CORESET may be considered as a cell-specific control resource set. That is, a plurality of terminal devices in one cell may share the CORESET.

(5) A carrier (component carrier, CC) in this application corresponds to a specific frequency band, or may be understood as a virtual cell, for example, a serving cell, in a specific network architecture. Each carrier corresponds to a group of specific configuration parameters. The configuration parameters include configuration information of one or more bandwidth parts (bandwidth part, BWP). Each BWP occupies a part or all of a bandwidth of the carrier. Configuration information of a BWP includes: frequency domain subcarrier spacing configuration information, a quantity of RBs and location information that are included in the BWP, uplink and downlink data channel configuration information, and control channel configuration information.

Specifically, the downlink control channel configuration information includes one or more pieces of control resource set configuration information. That is, for each control resource set, the terminal device may determine, based on the foregoing configuration information, a BWP and a carrier on which the terminal device is located. A group of specific configuration parameters corresponding to a carrier may be delivered by using RRC signaling, where in this case, the carrier may be considered as a user-specific carrier; or may be delivered by using a system message or a broadcast message, for example, is delivered by using an SIB, where in this case, the carrier may be considered as a cell-specific carrier. That is, a plurality of terminal devices in one cell may share the carrier. Further, a configured carrier may be activated or deactivated by using MAC CE signaling, and communication between the network device and the terminal device is performed only on an activated carrier. When a plurality of BWPs are configured in one carrier, the network device needs to additionally send signaling to indicate a BWP currently activated in the carrier, so that communication between the network device and the terminal device is performed only on the activated BWP.

(6) The terms "system" and "network" in embodiments of this application may be used interchangeably. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, a first signal and a second signal are merely intended to distinguish between different signals, but do not represent a difference between the two types of signals in content, priority, sending sequence, importance, or the like.

For ease of understanding this application, before the communication method provided in this application is described, the following technical features involved in this application are first briefly described.

A basic time unit for downlink resource scheduling in a 5G mobile communication system is one slot. One slot includes 7 or 14 symbols in time domain, and one slot may be divided into a control area and a data area. The data area is used to send a physical downlink shared channel (PDSCH) carrying downlink data. The control area is used to send a physical downlink control channel (PDCCH), and the PDCCH is used to carry downlink control information (DCI). Time-frequency resources used by the PDSCH and the PDCCH include one or more resource blocks (Resource Block, RB) in frequency domain. Each RB includes 12 subcarriers that are consecutive in frequency domain and 1 symbol in time domain. One subcarrier in frequency domain and one symbol in time domain are referred to as one resource element (RE).

Currently, a base station transmits a PDSCH to a terminal device, and the PDSCH is usually scheduled by using control information carried in a PDCCH. The control information is, for example, DCI. To correctly receive the PDSCH, the UE needs to first detect and decode the DCI. The DCI carried on the PDCCH includes transmission information indicating the PDSCH, for example, a time frequency space domain resource occupied by the PDSCH, that is, downlink resource allocation information. In a control area of a slot, there are one or more CORESETs, and the UE may detect the DCI on the one or more CORESETs. In addition, DCI detection may be performed for one or more times on each CORESET. The terminal device needs to receive a PDSCH based on an algorithm implemented by the terminal device, and determine HARQ-ACK information of the PDSCH based on a result of receiving the PDSCH to notify the network device whether the current PDSCH is correctly received. If the PDSCH is correctly decoded, the terminal device feeds back an ACK (a positive acknowledgment). Otherwise, the terminal device feeds back a NACK (a negative acknowledgment). For example, a bit position 0 of the HARQ-ACK information of the PDSCH indicates a NACK, and a bit position 1 indicates an ACK. HARQ-ACK information corresponding to a plurality of PDSCHs may be jointly encoded to generate one HARQ-ACK sequence, and the HARQ-ACK sequence is carried on an uplink resource. There are following two mechanisms for generating an existing HARQ-ACK sequence.

Mechanism 1: a static HARQ-ACK sequence, or referred to as a static HARQ-ACK codebook generation mechanism. To be specific, the terminal device determines a quantity of HARQ-ACK bits based on a quantity of PDSCHs that may be scheduled in a period of time, and determines a correspondence between each HARQ-ACK bit and a PDSCH based on a predefined order of the PDSCHs that may be scheduled, to load feedback information on a corresponding HARQ-ACK bit. This mechanism does not depend on an amount of DCI actually delivered by the base station. The quantity of HARQ-ACK bits is reserved.

Mechanism 2: a dynamic HARQ-ACK sequence, or referred to as a dynamic HARQ-ACK codebook generation mechanism. To be specific, the terminal device determines, based on information indicated by a DAI in detected DCI, a quantity of bits of a HARQ-ACK sequence and an order of each piece of DCI. An arrangement order of the DCI corresponds to a bit of feedback information of the PDSCH scheduled by the DCI in the HARQ-ACK sequence. The mechanism depends on the amount of DCI actually delivered by the base station. To enable the quantity of bits of the HARQ-ACK sequence fed back by the terminal device and the PDSCH corresponding to each bit to be consistent with the understanding of the base station, when delivering the DCI, the base station carries the DAI to clearly indicate the quantity of bits of the HARQ-ACK sequence and the PDSCH corresponding to each bit.

For the multi-base station communication scenarios shown in FIG. 1A and FIG. 1B, the terminal device has the following two HARQ-ACK information feedback modes. For example, an uplink resource carrying HARQ-ACK information is a PUCCH.

Mode 1: HARQ-ACK information of a plurality of base stations is fed back together, to be specific, the plurality of base stations deliver N PDSCHs, and the UE feeds back HARQ-ACK information corresponding to the N PDSCHs together. The HARQ-ACK information is carried on one PUCCH resource, and the HARQ-ACK information corresponds to one HARQ-ACK sequence, in other words, the HARQ-ACK information is jointly encoded.

Mode 2: HARQ-ACK information of each base station is independently fed back. It is assumed that two base stations send N PDSCHs to the terminal device, a base station 1 delivers N1 PDSCHs, and a base station 2 delivers N2 PDSCHs. The UE separately feeds back HARQ-ACK information corresponding to the N1 PDSCHs and the N2 PDSCHs. HARQ-ACK information corresponding to the N1 PDSCHs forms a HARQ-ACK sequence and is carried on a PUCCH 1. HARQ-ACK information corresponding to the N2 PDSCHs forms a HARQ-ACK sequence and is carried on a PUCCH 2.

Currently, a dynamic HARQ-ACK codebook determines, based on information indicated by the DAI of the actual DCI, a quantity of HARQ-ACK bits and an order of feedback information of a PDSCH scheduled by each piece of DCI in a HARQ-ACK sequence.

Figure 2A:
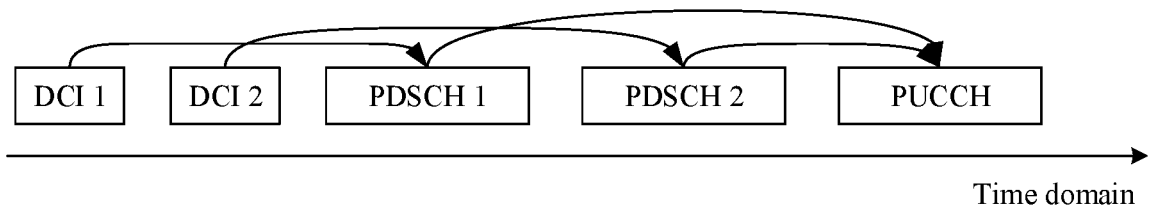
FIG. 2A to FIG. 2D are schematic diagrams of dynamic HARQ-ACK code division generation mechanisms according to an embodiment of this application.

Specifically, first, the terminal device needs to determine HARQ-ACK feedback information of which PDSCHs generates one HARQ-ACK sequence. A manner is that a time domain position (for example, a slot slot) of an uplink feedback is determined based on detected DCI, and a unified feedback is performed for DCI indicating a same PUCCH time domain position. For example, in FIG. 2A, the terminal device determines time domain positions of the PDSCH 1 and the PDSCH 2 based on time domain positions of the DCI 1 and the DCI 2 and time domain positions of PDSCHs, respectively indicated by the two DCI, relative to the DCI; and determines, based on HARQ-ACK feedback delay information indicated by the DCI 1 and the DCI 2, time domain positions of PUCCHs corresponding to the PDSCH 1 and the PDSCH 2. When the time domain positions of the PUCCHs indicated by the two pieces DCI are the same, for example, are in a same slot, HARQ-ACKs of the two PDSCHs are fed back together. Based on the foregoing mechanism, a quantity of HARQ-ACK bits carried on each PUCCH may be determined, in other words, a corresponding quantity of PDSCHs are fed back.

Then, the terminal device needs to determine, based on a predefined DCI arrangement order, a PDSCH corresponding to a HARQ-ACK fed back on each bit of a corresponding HARQ-ACK, to feed back information about a corresponding PDSCH on each bit.

Figure 2B:
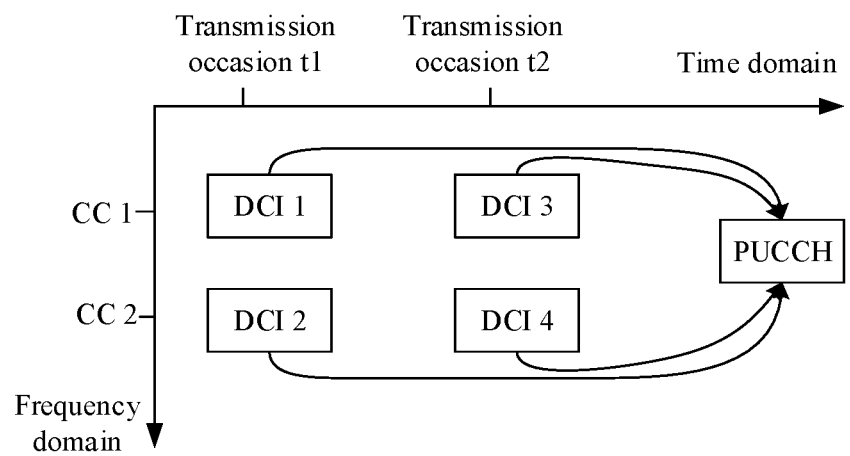

A DCI arrangement order criterion is as follows: In a first step, all DCI is arranged in an order of PDCCH transmission occasions (monitoring occasion). In a second step, DCI having a same arrangement order after the arrangement in the first step is further arranged in ascending order of carrier (Component Carrier, CC) index values. The PDCCH monitoring occasion is determined based on a PDCCH detection period, a detection offset, and a detection pattern (configured in a search space set). For example, in FIG. 2B, the terminal device determines that four pieces of DCI correspond to a same feedback moment (that is, a same PUCCH resource). It is determined, based on the foregoing first step, that the DCI 1 and the DCI 2 are arranged before the DCI 3 and the DCI 4; and it is determined, based on the foregoing second step, that the DCI 1 is arranged before the DCI 2 and that the DCI 3 is arranged before the DCI 4. After the DCI arrangement, HARQ-ACK feedback information corresponding to the DCI 1 is located on the first bit in the HARQ-ACK sequence, HARQ-ACK feedback information corresponding to the DCI 2 is located on the second bit in the HARQ-ACK sequence, and so on.

Figure 2C:
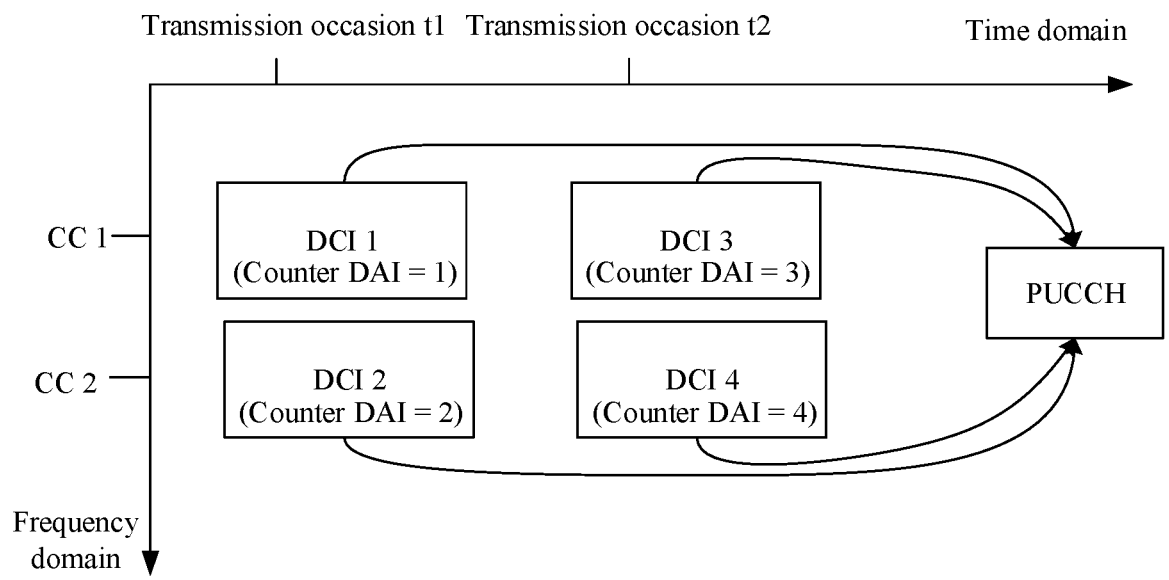

To avoid a case in which a quantity of HARQ-ACK bits is different from a quantity of HARQ-ACK bits understood by the base station because the terminal device misses DCI and improve transmission robustness, in the conventional technology, each piece of DCI carries a field indicating an amount of accumulated DCI, which is referred to as a counter downlink assignment index (Downlink Assignment Indication, DAI), to avoid ambiguity in the quantity HARQ-ACK bits caused when the DCI is not detected. This field (usually two bits) is used to indicate an arrangement order of the current DCI (where an indication rule is the same as those for arranging the DCI), and further indicate a bit position of a HARQ-ACK corresponding to the current DCI. For example, in FIG. 2C, counter DAIs in DCI 1 to DCI 4 respectively indicate 1 to 4. Therefore, if the DCI 3 is not detected, the UE may determine, based on the counter DAI=4 indicated by the DCI 4, that four pieces of DCI are currently sent. There are four HARQ-ACK information bits, and a feedback corresponding to the third HARQ-ACK bit is a NACK.

Figure 2D:
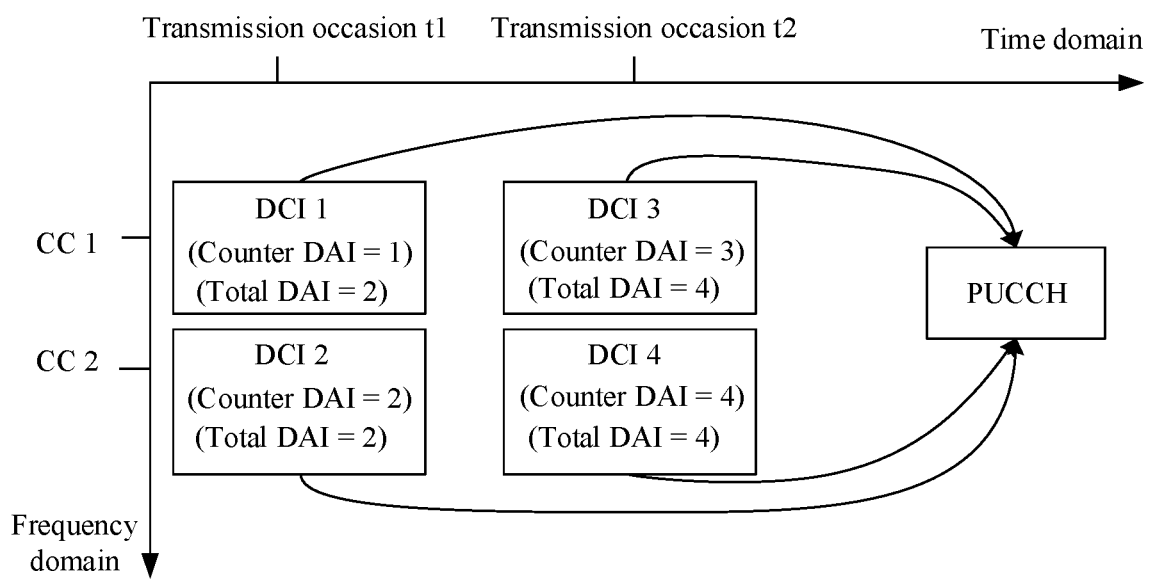

To further improve the robustness, for example, when a quantity of configured carriers is greater than 1, a possibility of missing DCI increases. Therefore, an additional information total DAI is required to indicate DCI existing in a current PDCCH monitoring occasion, to ensure that the UE and the base station have consistent understanding for the quantity of HARQ-ACK bits. For example, in FIG. 2D, if two carriers are configured, DCI includes a total DAI to indicate a total amount of DCI at a current moment and before the current moment. For example, DCI 1 and DCI 2 on a PDCCH monitoring occasion 1 both indicate that the total DAI=2. It indicates that the total amount of DCI of HARQ-ACKs fed back on the current PDCCH monitoring occasion and before the current PDCCH monitoring occasion is 2. In the conventional technology, the terminal device determines a quantity of bits of a DAI (that is, whether the total DAI exists) in the DCI only based on a quantity of carriers corresponding to a configured CORESET, and further, determine the quantity of HARQ-ACK bits. Grouping information of the CORESET is not considered. Feedback information corresponding to uplink data scheduled by DCI carried in CORESETs in different groups may be separately fed back. Therefore, according to the conventional technology, the terminal device and the network device may have different understanding for a quantity of bits of DCI.

Figure 3:
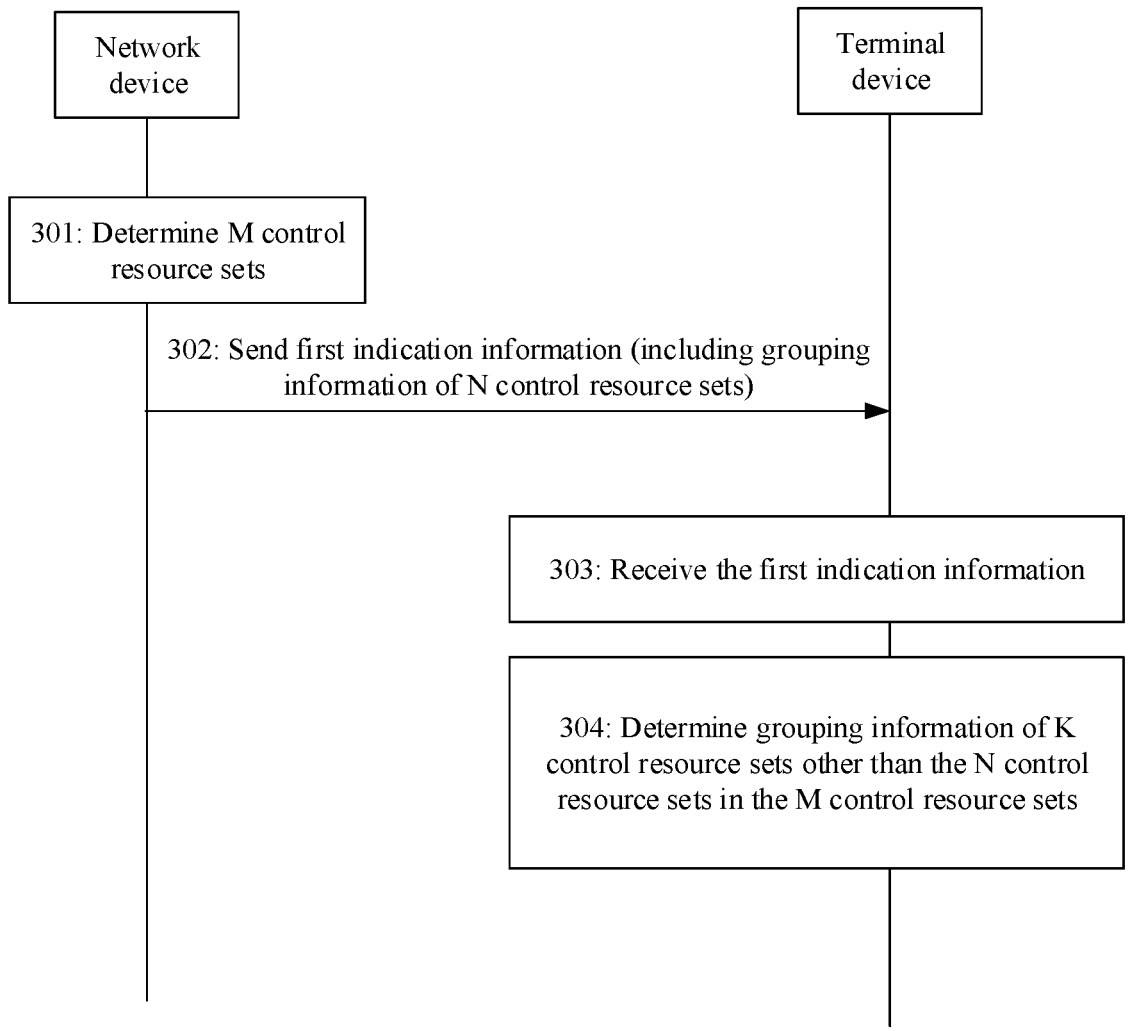
FIG. 3 is a schematic diagram of a communication method according to an embodiment of this application.

In view of this, FIG. 3 is a schematic flowchart of a first communication method according to an embodiment of this application. Refer to FIG. 3. The method includes the following steps.

Step 301: A network device determines M control resource sets.

Specifically, the network device determines one or more carriers, including an identifier of each carrier, physical resource position information, and the like. One or more control resource sets are configured on each carrier. In addition, the network device further determines grouping information of a control resource set. The grouping information may be carried in a parameter set corresponding to the control resource set, and there may be a plurality of values. PDSCHs scheduled by DCI carried in control resource sets with same grouping information may be fed back together, that is, corresponding HARQ-ACK information may be used to generate one HARQ-ACK sequence and is carried on a same uplink resource. It may be understood that the grouping information may be used to represent transmission point information to which the control resource set belongs. HARQ-ACK information corresponding to PDSCHs scheduled by a same transmission point may all be fed back to the transmission point. For example, if one terminal device communicates with two transmission points, grouping information of M configured control resource sets is 0 or 1. It may be understood as that the M control resource sets are divided into two groups, and group numbers are 0 and 1. HARQ-ACK information corresponding to a control resource set whose grouping information is configured as 0 may centrally generate one HARQ-ACK sequence carried on an uplink resource. Because HARQ-ACK feedback information of PDSCHs on a plurality of carriers may be encoded and fed back together, a control resource set on each carrier may be classified into the group 0 or the group 1, in other words, grouping information on different carriers is consistent. In this case, if control resource sets on a plurality of carriers have same grouping information, data scheduled on the plurality of carriers may be encoded and fed back together. In addition to the foregoing function, the grouping information in the control resource set may further be used by the terminal device to sort the DCI, when HARQ-ACK feedback information corresponding to PDSCHs supporting scheduling of a plurality of sites is encoded together and is carried on a same uplink resource. In other words, in addition to a PDCCH detection occasion and a carrier number, the DCI is further sorted based on the grouping information to determine a PDSCH corresponding to each bit of a HARQ-ACK.

Step 302: The network device sends first indication information to the terminal device, where the first indication information is used to indicate grouping information of N control resource sets in the M control resource sets, and N is less than M.

The grouping information of the N control resource sets is related to grouping information corresponding to K control resource sets other than the N control resource sets in the M control resource sets.

In other words, the first indication information includes grouping information of some control resource sets in the M control resource sets, and grouping information of some other control resource sets is defaulted. The grouping information may be an identifier or an index value (for example, a group number). For example, the first indication information is used to indicate that grouping information of a CORESET #1 is 0 and grouping information of a CORESET #2 is 1.

Optionally, the network device sends configuration information of the M control resource sets to the terminal device.

Further, optionally, the configuration information includes the first indication information.

Specifically, the M control resource sets may be control resource sets in a carrier configured by the network device by using radio resource control (RRC) signaling.

Optionally, the M control resource sets may further be control resource sets in a carrier activated by the network device by using media access control control element (MAC CE) signaling. Specifically, the network device may configure one or more carriers, where the one or more carriers may include configuration information of a corresponding control resource set; and further activate some or all control resource sets in the one or more carriers by using the MAC CE signaling. Step 303: The terminal device receives the first indication information.

Step 304: The terminal device determines grouping information corresponding to K control resource sets other than the N control resource sets in the M control resource sets based on the first indication information.

K is a positive integer greater than or equal to 1. Possible values of K are as follows: It is assumed that the M control resource sets are all control resource sets in all carriers configured by a base station. If the grouping information corresponding to the K control resource sets is determined based on grouping information of control resource sets in all carriers configured by using RRC signaling, K is equal to a difference between M and N. If the grouping information corresponding to the K control resource sets is determined based on grouping information of a control resource set in an activated carrier, K may be less than a difference between M and N.

For example, the M control resource sets are control resource sets in the activated carrier. If the grouping information corresponding to the K control resource sets is determined based on grouping information of control resource sets in all activated carriers, K is equal to a difference between M and N.

For example, the M control resource sets are control resource sets in one carrier. If the grouping information corresponding to the K control resource sets is determined based on grouping information of a same carrier, K is equal to a difference between M and N.

The following describes various cases in which the terminal device determines the grouping information of the K control resource sets in the embodiment shown in FIG. 3.

Case 1: The M control resource sets are all located on a same carrier or a same bandwidth part (BWP). When the grouping information of the N control resource sets is the same, the terminal device determines that the grouping information of the K control resource sets is the same as the grouping information of the N control resource sets. That is, the M control resource sets are all located on a same carrier or a same BWP. When the grouping information of the N control resource sets is the same, HARQ-ACK feedback information corresponding to PDSCHs scheduled by DCI carried in the N control resource sets and the K control resource sets may be encoded together, generate a same HARQ-ACK feedback sequence, and may be carried on a same uplink resource. Alternatively, it may be understood that the N control resource sets and the K control resource sets correspond to a same transmission point.

Figure 4A:
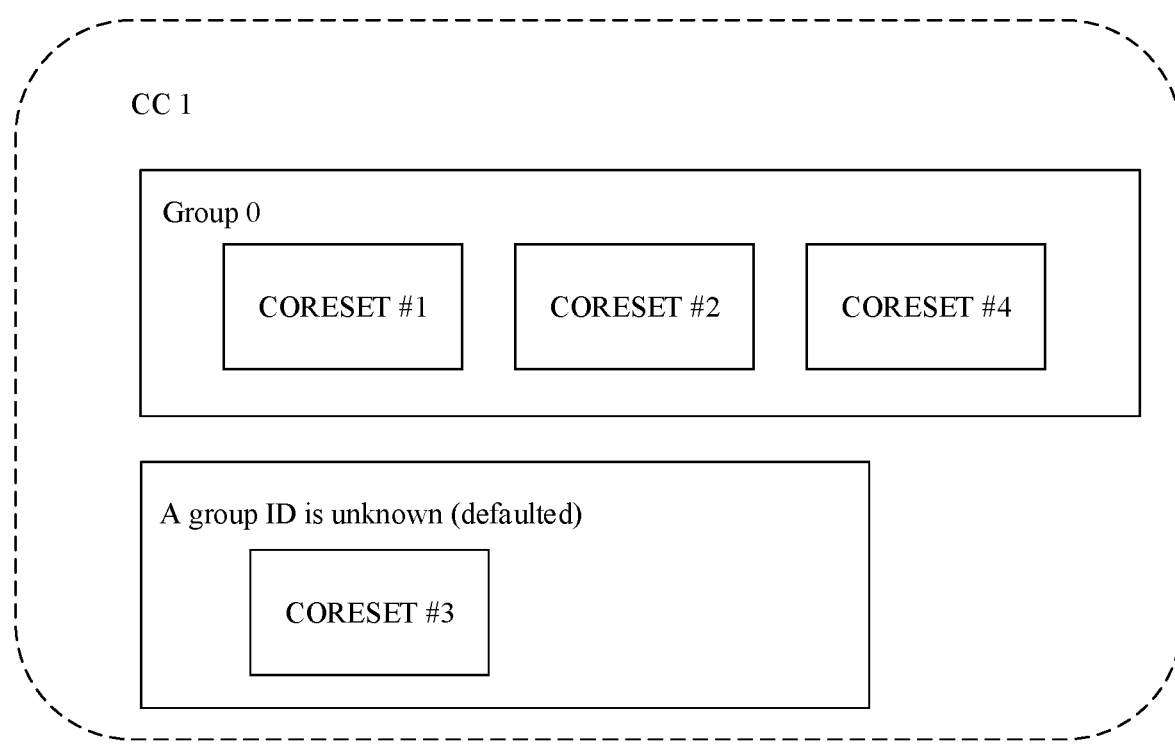
FIG. 4A to FIG. 4I are schematic diagrams of cases of determining grouping information according to an embodiment of this application.

For example, as shown in FIG. 4A, in one carrier configured by a base station, grouping information configured for a CORESET #1 is a group 0, grouping information configured for a CORESET #2 is a group 0, grouping information of a CORESET #3 is defaulted, and grouping information configured for a CORESET #4 is the group 0. The terminal device may determine, based on the group 0 in which the CORESET #1, the CORESET #2, and the CORE- SET #4 are located, that the grouping information of the CORESET #3 is the group 0. That is, the CORESET #1, the CORESET #2, the CORESET #3, and the CORESET #4 correspond to a same transmission point.

Case 2: The M control resource sets are all located on a same carrier or a same BWP. When grouping information of at least two control resource sets in the N control resource sets is different, the terminal device determines that the grouping information of the K control resource sets is the same as grouping information of a first control resource set in the N control resource sets, where the grouping information of the first control resource set is a minimum value or a maximum value in the grouping information of the N control resource sets. That is, the M control resource sets are all located on a same carrier or a same BWP. When grouping information of at least two control resource sets in the N control resource sets is different, an example in which the grouping information of the first control resource set is the minimum value in the grouping information of the N control resource sets is used. HARQ-ACK feedback information corresponding to the control resource set with the minimum value in the grouping information of the N control resource sets and PDSCHs scheduled by DCI carried in the K control resource sets may be encoded together, generate a same HARQ-ACK feedback sequence, and may be carried on a same uplink resource. Alternatively, it may be understood as that the control resource set with the minimum value in the grouping information of the N control resource sets and the K control resource sets correspond to a same transmission point.

Figure 4B:
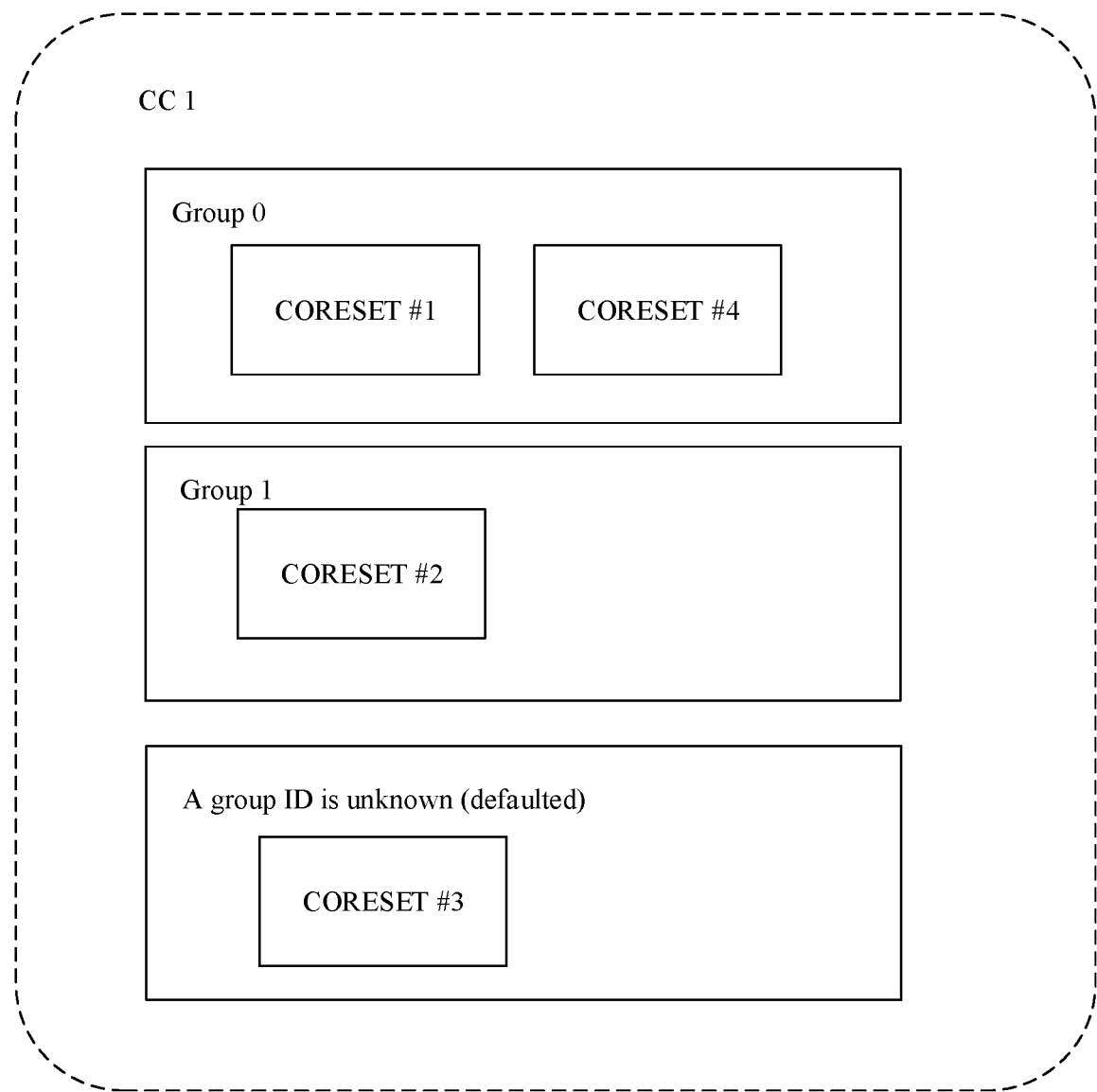

For example, as shown in FIG. 4B, in one carrier configured by a base station, grouping information configured for a CORESET #1 is a group 0, grouping information configured for a CORESET #2 is a group 1, grouping information of a CORESET #3 is defaulted, and grouping information configured for a CORESET #4 is the group 0. The terminal device may determine that the grouping information of the CORESET #3 is the group 0, or the terminal device may determine that the grouping information of the CORESET #3 is the group 1. In other words, when the CORESET #3 corresponds to minimum grouping information, the CORESET #1, the CORESET #3, and the CORE- SET #4 correspond to a same transmission point; or when the CORESET #3 corresponds to maximum grouping information, the CORESET #2 and the CORESET #3 correspond to a same transmission point.

Case 3: The M control resource sets are located on different carriers. When the grouping information of the N control resource sets is the same, the terminal device determines that the grouping information of the K control resource sets is the same as the grouping information of the N control resource sets. That is, the M control resource sets are configured in a plurality of carriers. When all control resource sets configured with grouping information, for example, the N control resource sets, are configured with the same grouping information, HARQ-ACK feedback information corresponding to PDSCHs scheduled by DCI carried in the N control resource sets and the K control resource sets may be encoded together, generate a same HARQ-ACK feedback sequence, and may be carried on a same uplink resource. Alternatively, it may be understood that the N control resource sets and the K control resource sets correspond to a same transmission point.

Figure 4C:
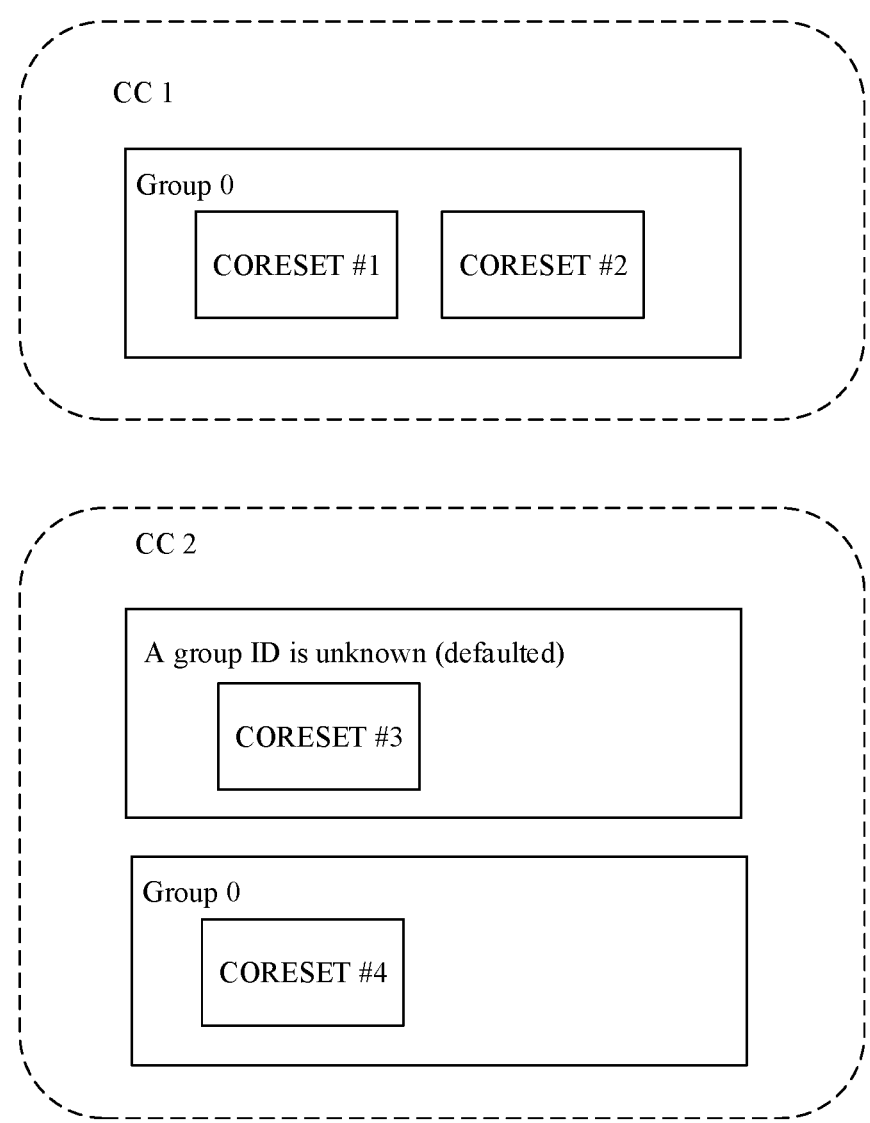

For example, as shown in FIG. 4C, a base station configures a total of two carriers. Grouping information configured for a CORESET #1 on a first carrier (CC 1) is a group 0, grouping information configured for a CORESET

2 is the group 0, grouping information configured for a CORESET #3 on a second carrier is defaulted, and grouping information configured for a CORESET #4 on the second carrier (CC 2) is the group 0. The terminal device may determine that the grouping information of the CORESET #3 on the second carrier is the group 0. That is, the CORESET #1, the CORESET #2, the CORESET #3, and the CORESET #4 correspond to a same transmission point.

Case 4: The M control resource sets are located on different carriers. When grouping information of at least two control resource sets in the N control resource sets is different, the terminal device determines that the grouping information of the K control resource sets is the same as grouping information of a first control resource set in the N control resource sets, where the grouping information of the first control resource set is a minimum value or a maximum value in the grouping information of the N control resource sets. That is, the M control resource sets are located on different carriers. When grouping information of at least two control resource sets in the N control resource sets is different, an example in which the grouping information of the first control resource set is the minimum value in the grouping information of the N control resource sets is used. HARQ-ACK feedback information corresponding to the control resource set with the minimum value in the grouping information of the N control resource sets and PDSCHs scheduled by DCI carried in the K control resource sets may be encoded together, generate a same HARQ-ACK feedback sequence, and may be carried on a same uplink resource. Alternatively, it may be understood as that the control resource set with the minimum value in the grouping information of the N control resource sets and the K control resource sets correspond to a same transmission point.

Figure 4D:
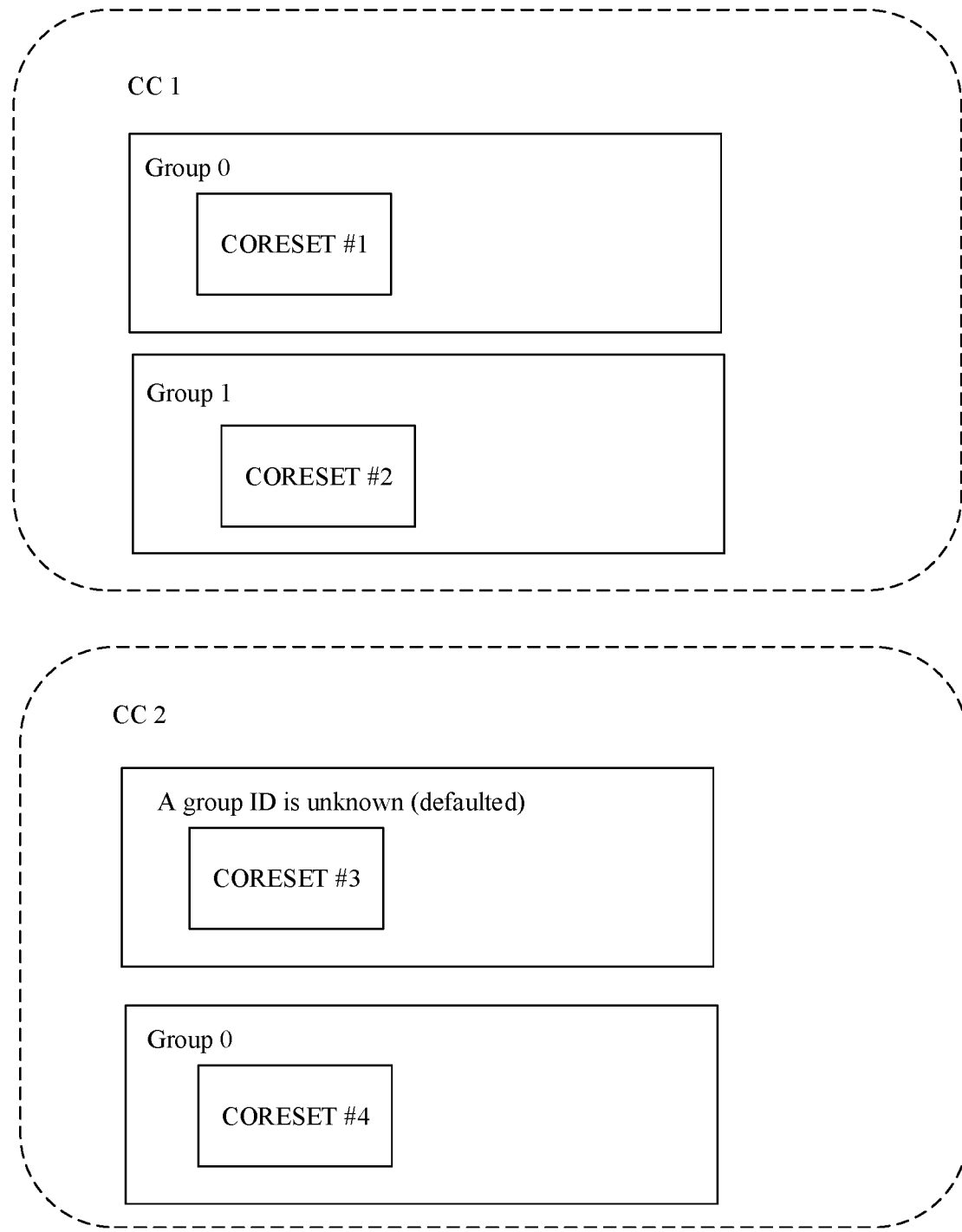

For example, as shown in FIG. 4D, a base station configures a total of two carriers. Grouping information configured for a CORESET #1 on a first carrier (CC 1) is a group 0, grouping information configured for a CORESET #2 is a group 1, grouping information configured for a CORESET #3 on a second carrier (CC 2) is defaulted, and grouping information configured for a CORESET #4 on the second carrier is the group 0. The terminal device may determine that the grouping information of the CORESET #3 on the second carrier is the minimum value (the group 0), or the terminal device may determine that the grouping information of the CORESET #3 on the second carrier is the maximum value (the group 1). In other words, when the CORESET #3 corresponds to the minimum grouping information, the CORESET #1, the CORESET #3, and the CORESET #4 correspond to a same transmission point; or when the CORESET #3 corresponds to the maximum grouping information, the CORESET #2 and the CORESET #3 correspond to a same transmission point.

Case 5: The M control resource sets are located on different carriers. When grouping information of L control resource sets whose grouping information is indicated in same carrier is the same, it is determined that grouping information of a control resource set whose grouping information is not indicated in the carrier is the same as the grouping information of the L control resource sets, where L is less than or equal to N.

That is, the M control resource sets are located on different carriers. When the grouping information of the L control resource sets whose grouping information is indicated in a same carrier is the same, HARQ-ACK feedback information corresponding to PDSCHs scheduled by DCI carried in the L control resource sets and a control resource set in the K control resource sets that is located on the same carrier as the L control resource sets may be encoded together, generate a same HARQ-ACK feedback sequence, and may be carried on a same uplink resource. Alternatively, it may be understood that the L control resource sets and the control resource set in the K control resource sets that is located on the same carrier as the L control resource sets correspond to a same transmission point.

Figure 4E:
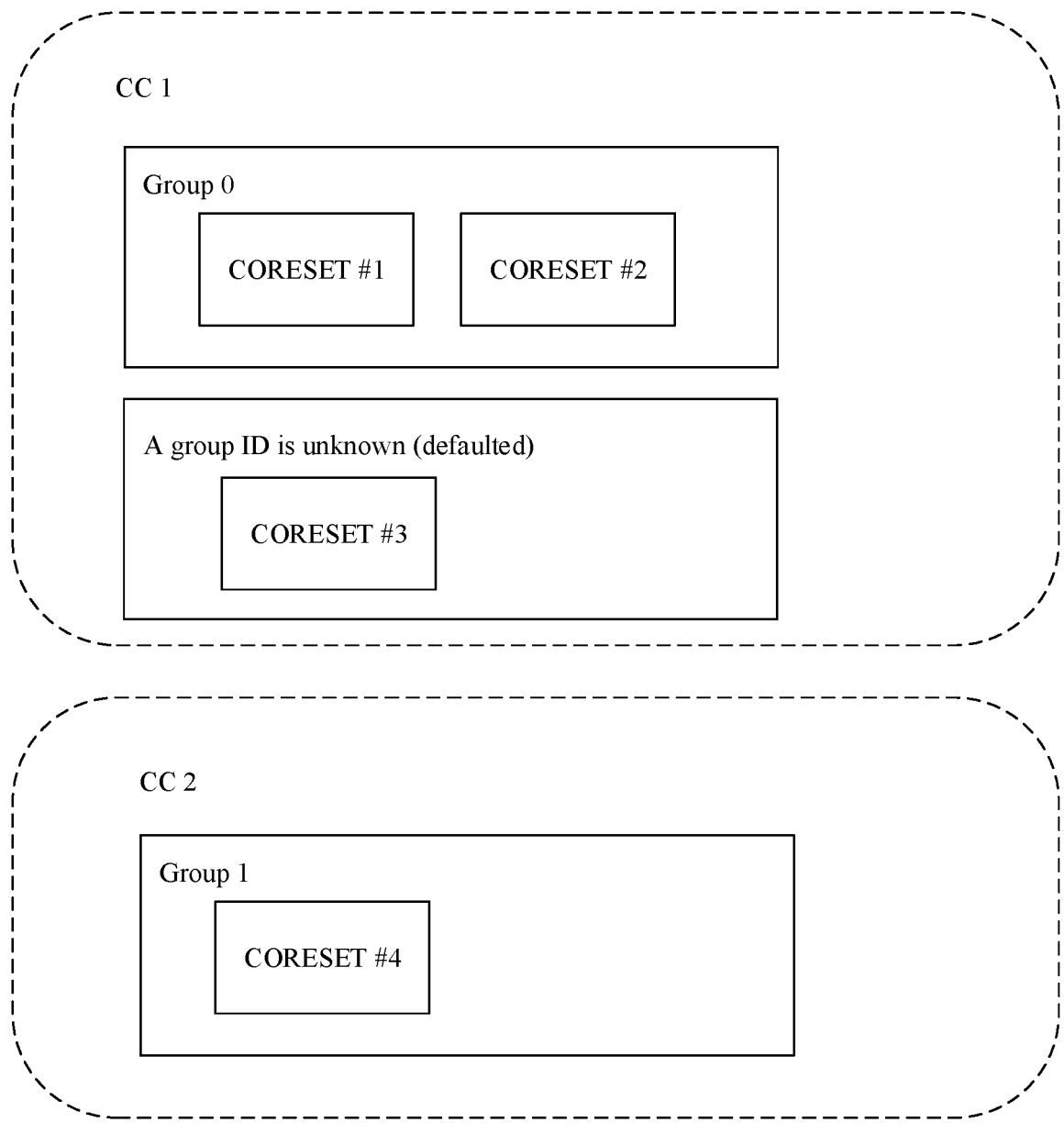

For example, as shown in FIG. 4E, a base station configures a total of two carriers. Grouping information configured for a CORESET #1 on a first carrier (CC 1) is a group 0, grouping information configured for a CORESET #2 is the group 0, grouping information configured for a CORESET #3 is defaulted, and grouping information configured for a CORESET #4 on a second carrier (CC 2) is a group 1. The terminal device may determine that the grouping information of the CORESET #3 on the first carrier is the group 0. That is, the CORESET #1, the CORESET #2, and the CORESET #3 correspond to a same transmission point.

Case 6: The M control resource sets are located on different carriers. When grouping information of at least two control resource sets in L control resource sets whose grouping information is indicated in a same carrier is different, it is determined that grouping information of a control resource set whose grouping information is not indicated in the carrier is the same as grouping information of a second control resource set, where the grouping information of the second control resource set is a minimum value or a maximum value in the grouping information of the L control resource sets.

That is, the M control resource sets are located on different carriers. When grouping information of at least two control resource sets in the L control resource sets whose grouping information is indicated in the same carrier is different, an example in which the grouping information of the second control resource set is the minimum value in the L control resource sets is used, and HARQ-ACK feedback information corresponding to PDSCHs scheduled by DCI carried the control resource set with the minimum value in the grouping information of in the L control resource sets and a control resource set in the K control resource sets that is located in the same carrier as the L control resource sets may be encoded together, generate a same HARQ-ACK feedback sequence, and may be carried on a same uplink resource. Alternatively, it may be understood that the control resource set with the minimum value in the grouping information of the L control resource sets and the control resource set in the K control resource sets that is located on the same carrier as the L control resource sets correspond to a same transmission point.

Figure 4F:
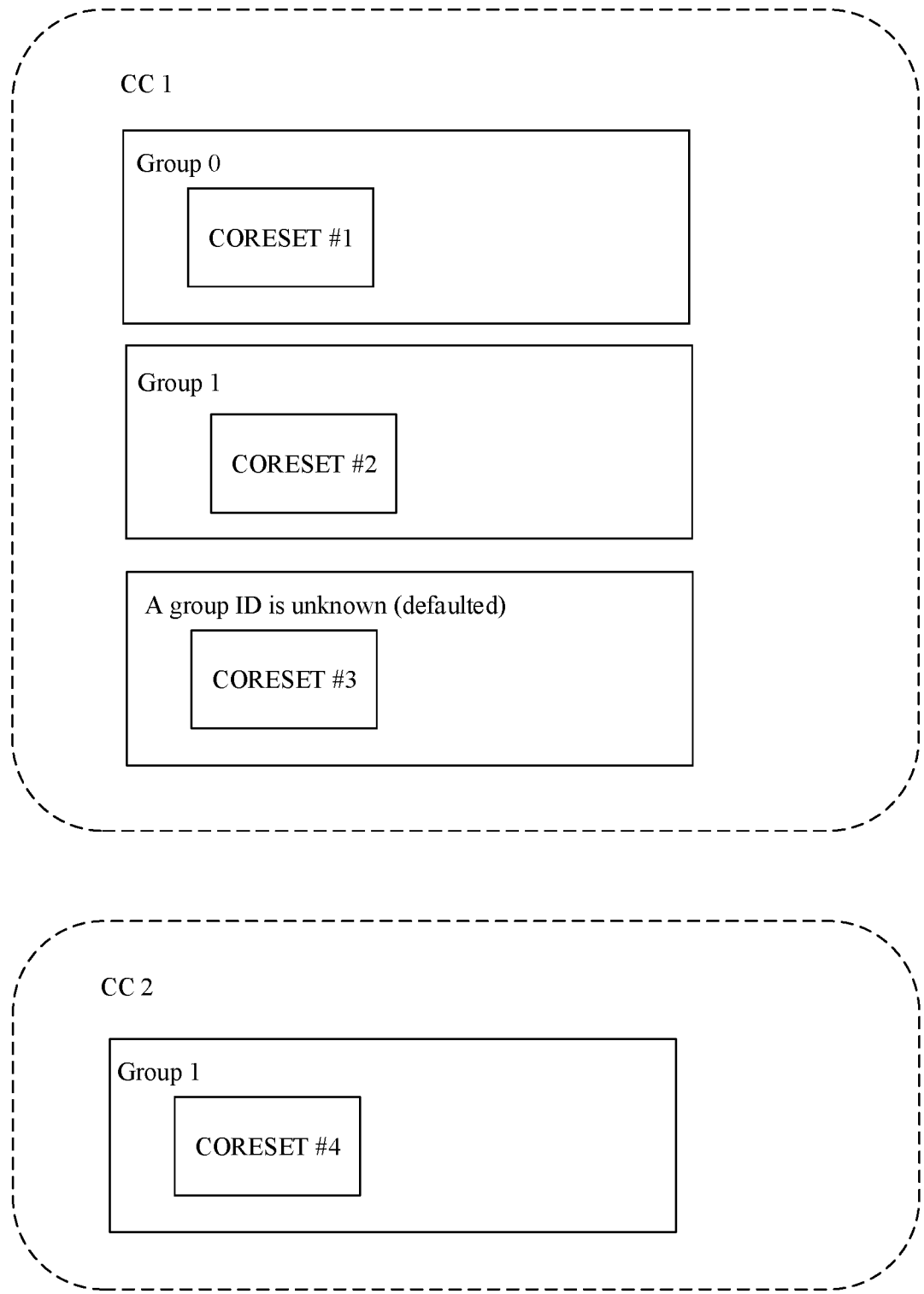

For example, as shown in FIG. 4F, a base station configures a total of two carriers. Grouping information configured for a CORESET #1 on a first carrier is a group 0, grouping information configured for a CORESET #2 is a group 1, grouping information configured for a CORESET #3 on the first carrier is defaulted, and grouping information configured for a CORESET #4 on a second carrier is the group 1. The terminal device may determine that the grouping information of the CORESET #3 on the first carrier is the minimum value (the group 0), in other words, the CORESET #1 and the CORESET #3 correspond to a same transmission point; or may determine that the grouping information of the CORESET #3 on the first carrier is the maximum value (the group 1), in other words, the CORESET #2 and the CORESET #3 correspond to a same transmission point.

Case 7: The M control resource sets are located on one or more activated carriers. When the grouping information of the N control resource sets is the same, the terminal device determines that the grouping information of the K control resource sets is the same as the grouping information of the N control resource sets.

That is, the M control resource sets are in the activated carrier in the plurality of configured carriers. All control resource sets in the activated carrier are activated. For example, when the N control resource sets and the K control resource sets are configured with same grouping information, HARQ-ACK feedback information corresponding to PDSCHs scheduled by DCI carried in the N control resource sets and the K control resource sets may be encoded together, generate a same HARQ-ACK feedback sequence, and may be carried on a same uplink feedback resource. Alternatively, it may be understood that the N control resource sets and the K control resource sets correspond to a same transmission point.

Figure 4G:
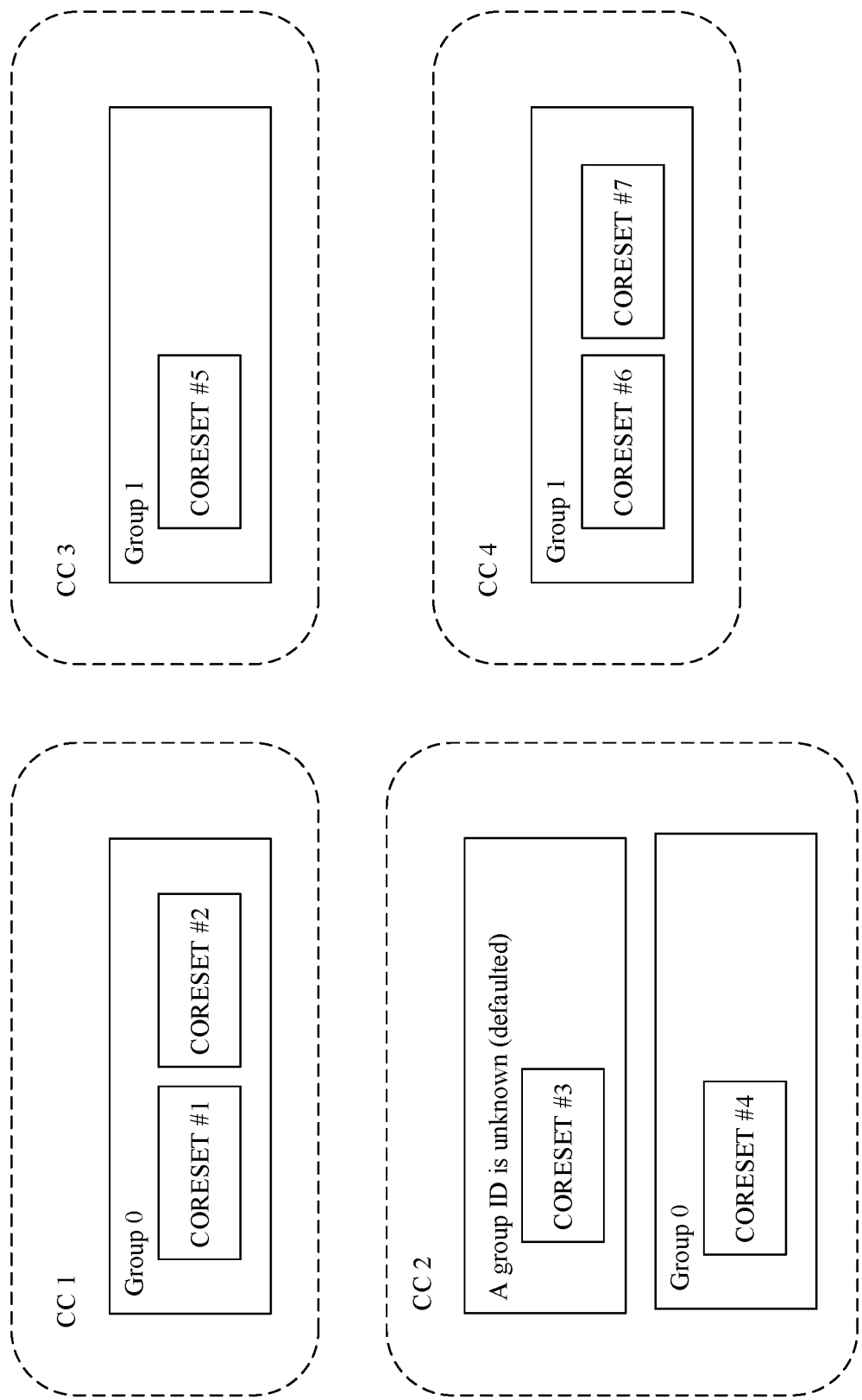

For example, as shown in FIG. 4G, a base station configures a total of four carriers, but activates only two carriers. Grouping information configured for a CORESET #1 on an activated first carrier (CC 1) is a group 0, grouping information configured for a CORESET #2 is the group 0, grouping information of a CORESET #3 on an activated second carrier (CC 2) is defaulted, grouping information configured for a CORESET #4 on the CC 2 is the group 0, grouping information configured for a CORESET #5 on an inactivated third carrier (CC 3) is a group 1, and grouping information configured for a CORESET #6 and a CORESET #7 on an inactivated fourth carrier (CC 4) is the group 1. The terminal device may determine that the grouping information of the CORESET #3 on the second carrier is the group 0. That is, the CORESET #1, the CORESET #2, the CORESET #3, and the CORESET #4 correspond to a same transmission point.

Case 8: The M control resource sets are located on one or more activated carriers. When grouping information of at least two control resource sets in the N control resource sets is different, the terminal device determines that the grouping information of the K control resource sets is the same as grouping information of a first control resource set in the N control resource sets, where the grouping information of the first control resource set is a minimum value or a maximum value in the grouping information of the N control resource sets.

That is, for example, when grouping information of at least two control resource sets in the N control resource sets is different, an example in which the grouping information of the first control resource set is the minimum value in the grouping information of the N control resource sets is used. HARQ-ACK feedback information corresponding to the control resource set with the minimum value in the grouping information of the N control resource sets and PDSCHs scheduled by DCI carried in the K control resource sets may be encoded together, generate a same HARQ-ACK feedback sequence, and may be carried on a same uplink resource. Alternatively, it may be understood as that the control resource set with the minimum value in the grouping information of the N control resource sets and the K control resource sets correspond to a same transmission point.

Figure 4H:
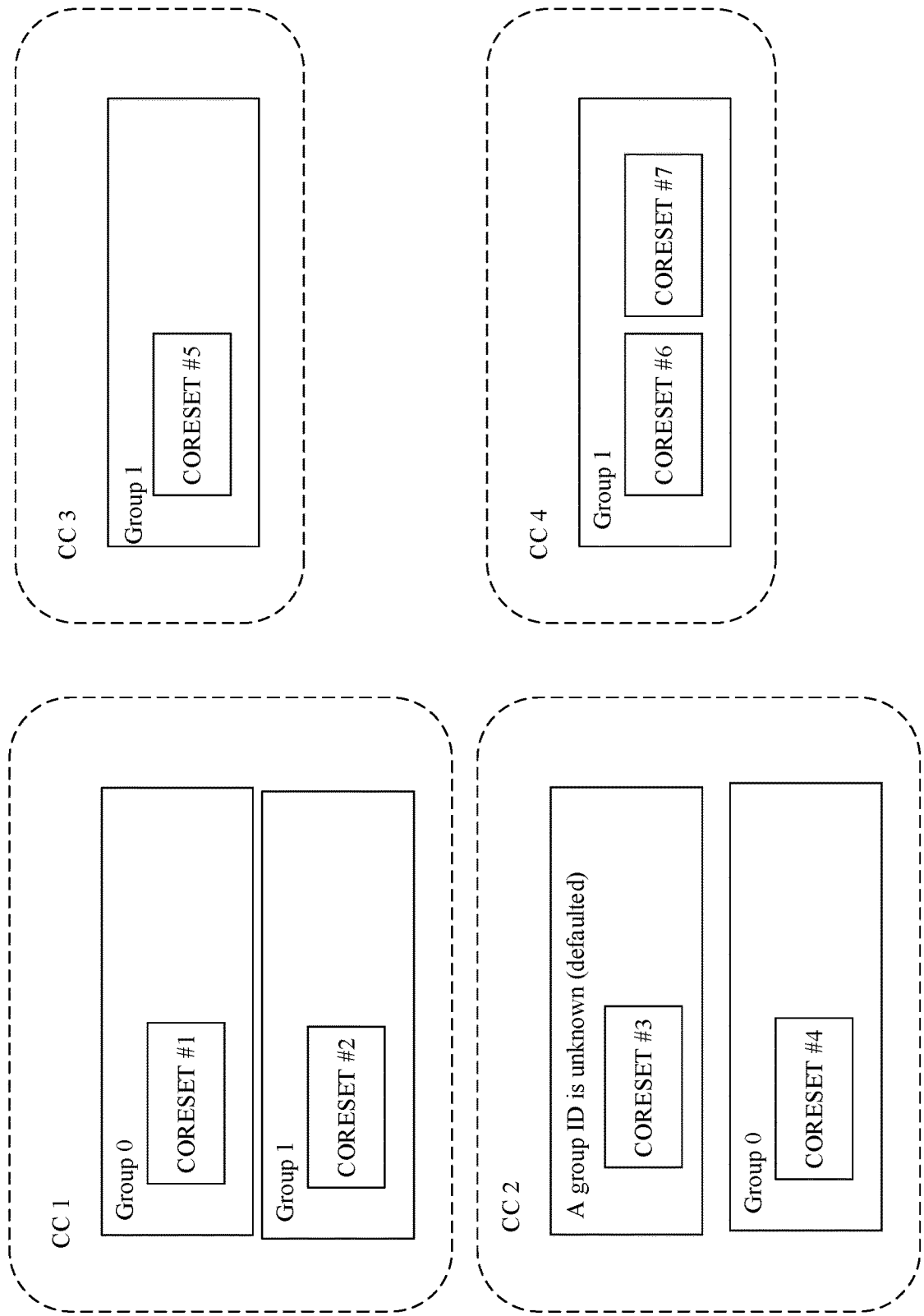

For example, as shown in FIG. 4H, a base station configures a total of four carriers, but activates only two carriers. Grouping information configured for a CORESET #1 on an activated first carrier (CC 1) is a group 0, grouping information configured for a CORESET #2 is a group 1, grouping information of a CORESET #3 on an activated second carrier (CC 2) is defaulted, grouping information configured for a CORESET #4 on the second carrier is the group 0, grouping information configured for a CORESET #5 on an inactivated third carrier (CC 3) is a group 1, and grouping information configured for a CORESET #6 and a CORESET #7 on an inactivated fourth carrier (CC 4) is the group 1. The terminal device may determine that the grouping information of the CORESET #3 on the second carrier is the minimum value (the group 0), or the terminal device may determine that the grouping information of the CORESET #3 on the second carrier is the maximum value (the group 1). In other words, when the CORESET #3 corresponds to the minimum grouping information, the CORESET #1, the CORESET #3, and the CORESET #4 correspond to a same transmission point; or when the CORESET #3 corresponds to the maximum grouping information, the CORESET #2 and the CORESET #3 correspond to a same transmission point.

Case 9: The grouping information corresponding to the K control resource sets is different from the grouping information corresponding to the N control resource sets. That is, HARQ-ACK feedback information corresponding to PDSCHs scheduled by DCI carried in the K control resource sets may be encoded together, generate a same HARQ-ACK feedback sequence, and may be carried on a same uplink resource. Alternatively, it may be understood that the K control resource sets correspond to a same transmission point.

Optionally, the HARQ-ACK feedback information corresponding to the PDSCHs scheduled by the DCI carried in the N control resource sets and the HARQ-ACK feedback information corresponding to the PDSCHs scheduled by the DCI carried in the K control resource sets cannot be carried on a same uplink resource.

Figure 4I:
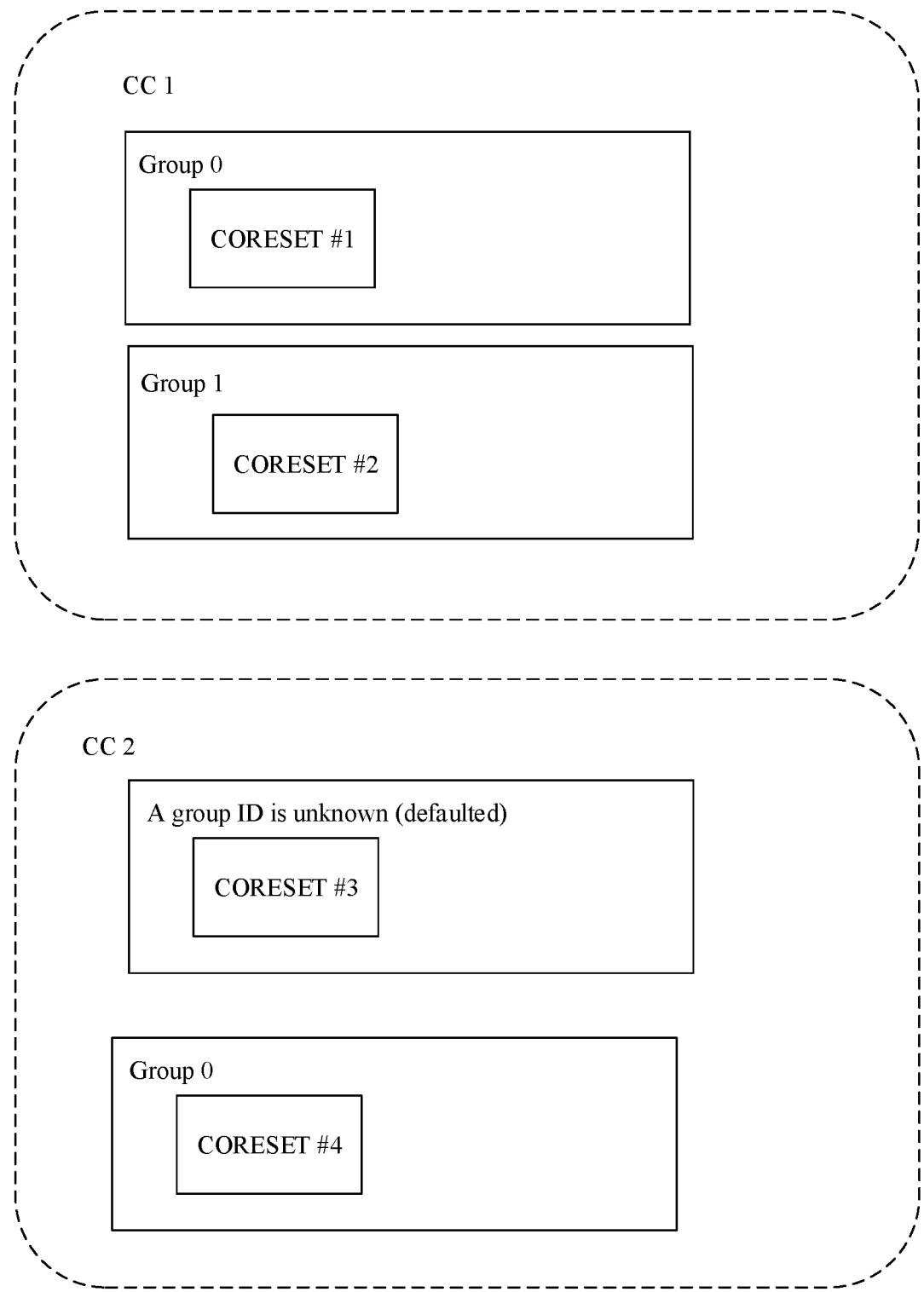

For example, as shown in FIG. 4I, a base station configures a total of two carriers. Grouping information configured for a CORESET #1 on a carrier 1 is a group 0, grouping information configured for a CORESET #2 is a group 1, grouping information of a CORESET #3 on a carrier 2 is defaulted, and grouping information configured for a CORESET #4 is the group 0. The terminal device determines that the grouping information of the CORESET #3 is not the group 0 and the group 1. The terminal device may determine that the grouping information of the CORESET #3 is a group 2, may be carried on a same uplink resource as HARQ-ACK feedback information corresponding to a PDSCH scheduled by DCI carried in the CORESET #3, and is not carried on a same uplink resource as HARQ-ACK feedback information corresponding to a PDSCH scheduled by DCI in another CORESET. The terminal device may alternatively not determine the grouping information of the CORESET #3, and directly determine that HARQ-ACK feedback information corresponding to the PDSCH scheduled by the DCI carried in the CORESET #3 is carried on a same uplink resource and is not carried on a same uplink resource as HARQ-ACK feedback information corresponding to a PDSCH scheduled by DCI in another CORESET.

It should be noted that the terminal device may not determine grouping information corresponding to a CORESET for which no grouping information is configured, but directly generate HARQ-ACK feedback information based on foregoing example cases.

Figure 5:
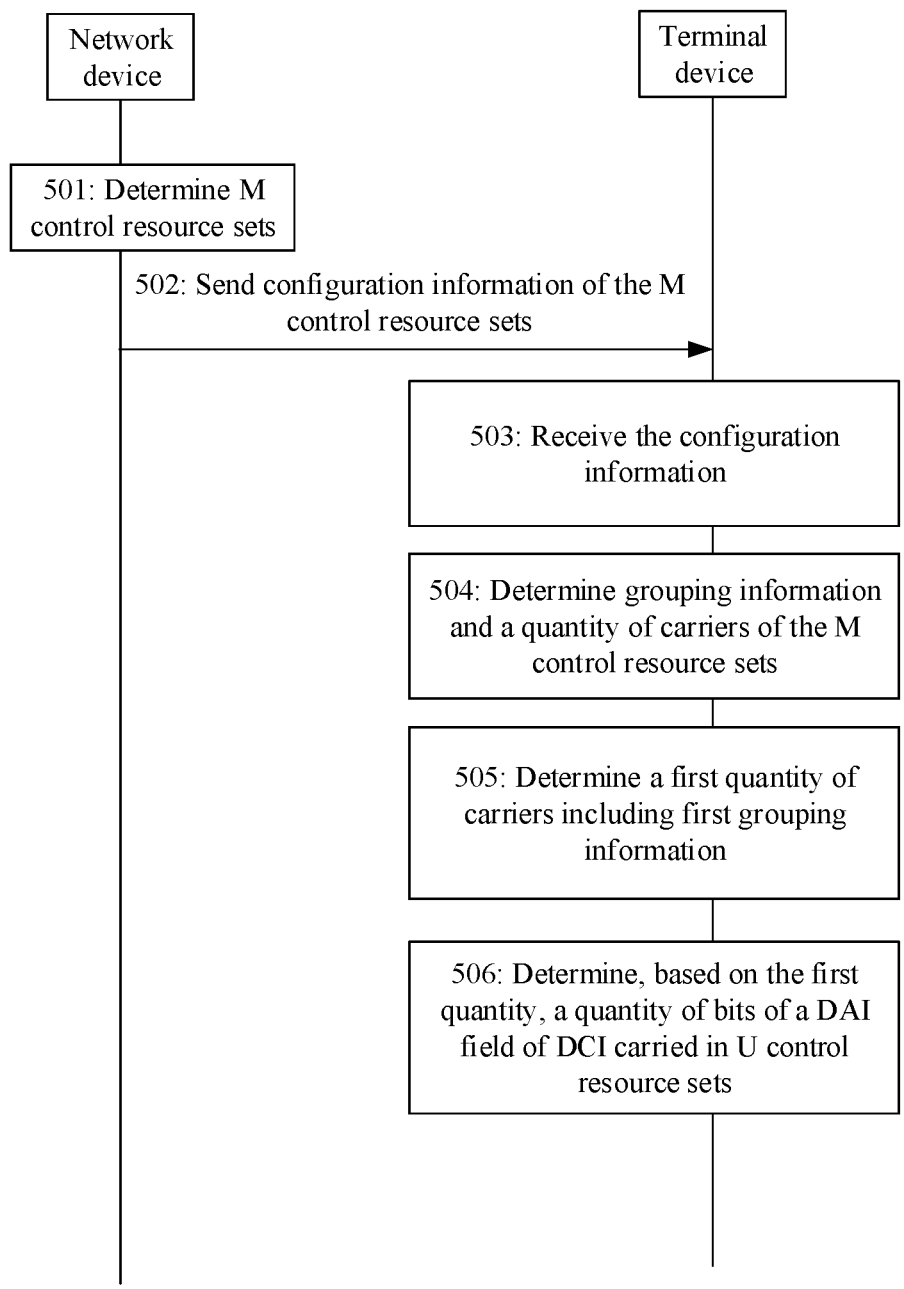
FIG. 5 is a schematic diagram of another communication method according to an embodiment of this application.

It is considered that when the terminal device independently feeds back feedback information corresponding to data scheduled by different transmission points, different groups corresponding to CORESETs may correspond to different quantities of carriers. Therefore, quantities of bits of DAIs in DCI corresponding to different groups need to be determined, so as to ensure that the terminal device can correctly receive the DCI and perform a HARQ-ACK feedback for each piece of grouping information. FIG. 5 is a schematic flowchart of another communication method according to an embodiment of this application. The method includes the following steps.

Step 501: A network device determines M control resource sets.

For a specific configuration manner for the M control resource sets, refer to step 301. Details are not described herein again.

Step 502: The network device sends configuration information of the M control resource sets to a terminal device.

In a case, the configuration information of the M control resource sets includes grouping information and carrier information of the M control resource sets. In another case, the configuration information of the M control resource sets includes the carrier information of the M control resource sets and grouping information of some control resource sets.

Step 503: The terminal device receives the configuration information.

Step 504: The terminal device determines the grouping information and the carrier information of the M control resource sets based on the configuration information.

In a case, if the configuration information of the M control resource sets that is sent by the network device to the terminal device includes the grouping information of the M control resource sets, the terminal device determines the grouping information of the M control resource sets based on the configuration information. In addition, the terminal device further determines the carrier information of the M control resource sets based on the configuration information sent by the network device.

In another case, if the configuration information of the M control resource sets that is sent by the network device to the terminal device includes grouping information of some control resource sets, the terminal device determines the grouping information of the M control resource sets according to the method in the embodiment shown in FIG. 3. In addition, the terminal device further determines the carrier information of the M control resource sets based on the configuration information sent by the network device.

Step 505: The terminal device determines a first quantity of carriers including first grouping information. The first quantity is associated with the grouping information and the carrier information of the M control resource sets.

In other words, the terminal device determines, based on the grouping information and the carrier information of the M control resource sets, a quantity of carriers corresponding to a control resource set of each piece of grouping information.

Optionally, the terminal device determines, based on a CORESET having the first grouping information, the first quantity of carriers including the first grouping information.

Specifically, it is assumed that the first grouping information is any grouping information in the grouping information of the M control resource sets. For U control resource sets of the first grouping information, when the U control resource sets are on a same carrier, a quantity of carriers that corresponds to the U control resource sets is 1; or when the U control resource sets are on two carriers, a quantity of carriers that corresponds to the U control resource sets is 2.

Step 506: The terminal device determines, based on the first quantity, a quantity of bits of a downlink assignment index (downlink assignment indication, DAI) field of DCI carried in the U control resource sets.

Specifically, when the first quantity corresponding to the U control resource sets is greater than 1, the terminal device determines that the quantity of bits of the DAI field of the DCI carried in the U control resource sets is a first value. For example, when the DAI is a total DAI, the first value is 2; or when the DAI includes a total DAI and a counter DAI, the first value is 4. When the first quantity corresponding to the U control resource sets is equal to 1, the terminal device determines that the quantity of bits of the DAI field of the DCI carried in the U control resource sets is a second value (for example, the quantity of bits is 4). The first value is greater than the second value. For example, when the DAI is a total DAI, the first value is 0; or when the DAI includes a total DAI and a counter DAI, the first value is 2.

Figure 6:
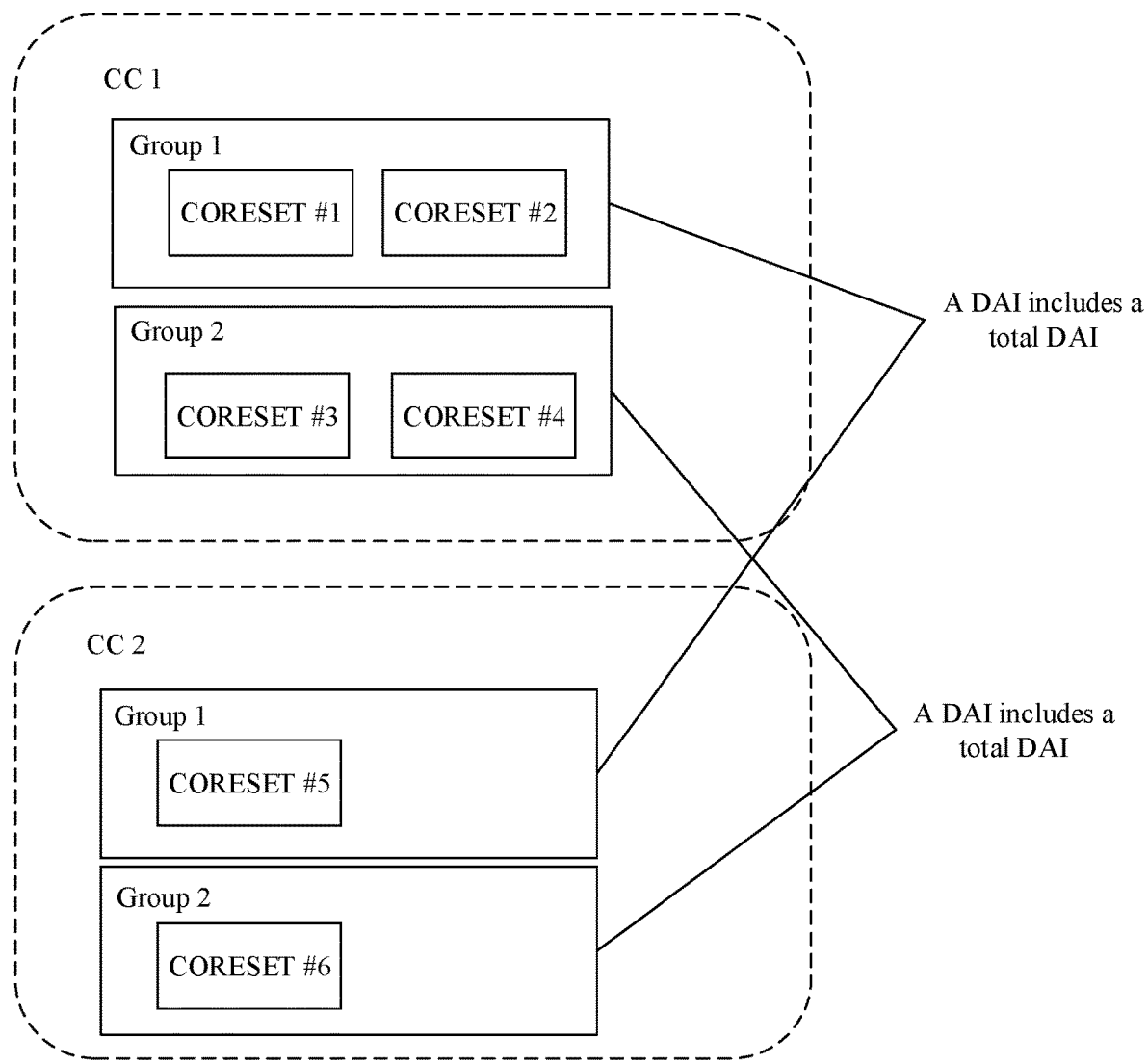
FIG. 6 and FIG. 7 are schematic diagrams of cases of determining a quantity of bits of DCI of a DAI according to an embodiment of this application.

For example, as shown in FIG. 6, a base station configures two carriers, where two groups of CORESETs are configured on a first carrier (CC 1), and two groups of CORESETs are configured on a second carrier (CC 2). On the CC 1, a CORESET #1 and a CORESET #2 are configured as a group 1, and a CORESET #3 and a CORESET #4 are configured as a group 2. On the second carrier, a CORESET #5 is configured as a group 1, and a CORESET #6 is configured as a group 2. The terminal device determines that the quantity of carriers that corresponds to the group 1 is 2, and the quantity of carriers that corresponds to the group 2 is 2. The terminal device determines that DCI corresponding to the group 1, that is, a DAI in DCI carried in the CORESET #1, the CORESET #2, and the CORESET #5 includes a total DAI and a quantity of bits is 4. The terminal device determines that DCI corresponding to the group 2, that is, a DAI in DCI carried in the CORESET #3, the CORESET #4, and the CORESET #6 also includes a total DAI and a quantity of bits is also 4.

Figure 7:
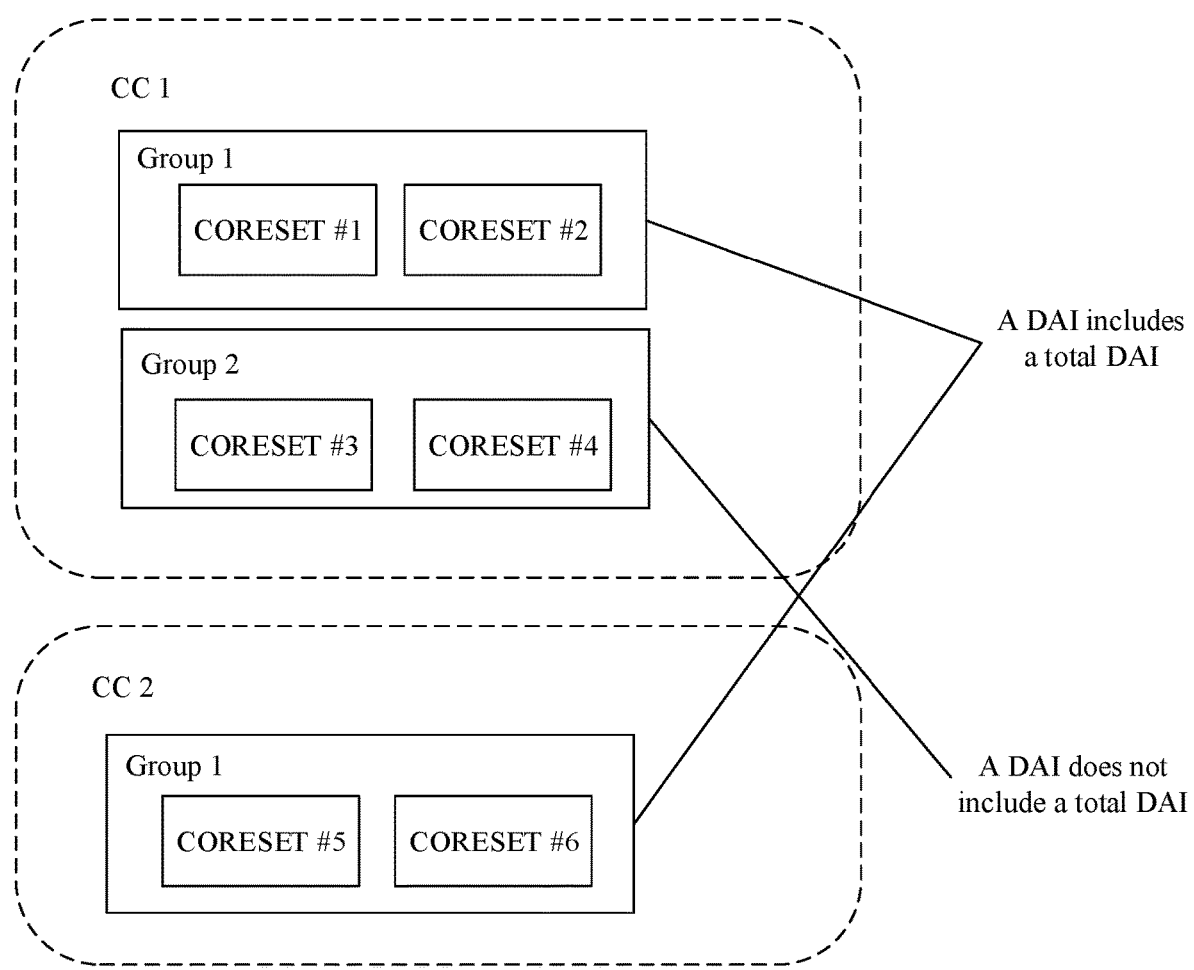

For example, as shown in FIG. 7, a base station configures two carriers, where two groups of CORESETs are configured on a first carrier (CC 1), and one group of CORESETs are configured on a second carrier (CC 2). On the CC 1, a CORESET #1 and a CORESET #2 are configured as a group 1, and a CORESET #3 and a CORESET #4 are configured as a group 2. On the second carrier, a CORESET #5 and a CORESET #6 are configured as a group 1. The terminal device determines that the quantity of carriers that corresponds to the group 1 is 2, and the quantity of carriers that corresponds to the group 2 is 1. The terminal device determines that DCI corresponding to the group 1, that is, a DAI in DCI carried in the CORESET #1, the CORESET #2, the CORESET #5, and the CORESET #6 includes a total DAI and a quantity of bits is 4. The terminal device determines that DCI corresponding to the group 2, that is, a DAI in DCI carried in the CORESET #3 and the CORESET #4 does not include a total DAI and a quantity of bits is 2.

In a possible embodiment, the network device determines a first quantity of carriers including first grouping information, where the first quantity is associated with the grouping information and the carrier information of the M control resource sets; and then, determines, based on the quantity of carriers including the first grouping information, the quantity of bits of the DAI field of the DCI carried in the U control resource sets corresponding to the first grouping information. Next, the network device sends, to the terminal device, the DCI including the quantity of bits of the DAI field. In this way, the network device and the terminal device have consistent understanding for the DCI including the quantity of bits of the DAI field. Therefore, subsequent transmission reliability can be ensured.

In a possible embodiment, the terminal device determines, based on the grouping information and the carrier information of the M control resource sets, a second quantity of carriers including second grouping information; and then, determines, based on the second quantity, a quantity of bits of a DAI field of DCI carried in V control resource sets corresponding to the second grouping information, where V is less than M, and V is a positive integer greater than or equal to 1. The terminal device detects, based on the quantity of bits of the DAI field of the DCI carried in the V control resource sets corresponding to the second grouping information, the DCI carried in the V control resource sets. The terminal device sends second feedback information of second downlink data, where the second downlink data is scheduled by the DCI carried in the V control resource sets.

In a possible design, the terminal device is configured with an independent feedback mode, in other words, the terminal device detects, based on the quantity of bits of the DAI field of the DCI carried in the U control resource sets corresponding to the first grouping information, the DCI carried in the U control resource sets.

In a possible design, the terminal device sends first feedback information of first downlink data, where the first downlink data is scheduled by DCI carried in the U control resource sets. It may be understood that there may be one or more pieces of first downlink data, and the first downlink data may be scheduled by one or more pieces of DCI carried in one or more of the U control resource sets. This is not limited in this embodiment of this application.

In a possible design, the terminal device detects, based on the quantity of bits of the DAI field of the DCI carried in the V control resource sets corresponding to the second grouping information, the DCI carried in the V control resource sets. The terminal device sends second feedback information of second downlink data, where the second downlink data is scheduled by the DCI carried in the V control resource sets. It may be understood that there may be one or more pieces of second downlink data, and the second downlink data may be scheduled by one or more pieces of DCI carried in one or more of the V control resource sets. This is not limited in this embodiment of this application.

In a possible design, an uplink feedback resource of downlink data scheduled by the DCI carried in the U control resource sets is different from an uplink feedback resource of downlink data scheduled by the DCI carried in the V control resource sets in a same time unit. That is, the first feedback information and the second feedback information are respectively carried on different uplink feedback resources in a same time unit. In other words, the terminal device separately sends downlink data scheduled by DCI carried in different groups, to ensure that feedback information of the downlink data scheduled by the DCI carried in the different groups is independently fed back.

In a possible design, the network device delivers HARQ-ACK feedback mode indication signaling, where the HARQ-ACK feedback mode indication signaling is used to indicate whether a HARQ-ACK feedback is an independent feedback or a joint feedback. When the HARQ-ACK feedback mode is indicated as the joint feedback, that is, the HARQ-ACK feedback supports HARQ-ACK feedbacks corresponding to data scheduled by the DCI carried in the U control resource sets corresponding to the first grouping information and the V control resource sets corresponding to the second grouping information being carried on a same uplink resource, the terminal device determines, based on a third quantity, the quantities of bits of the DAI fields of the DCI carried in the U control resource sets corresponding to the first grouping information and the V control resource sets corresponding to the second grouping information. The third quantity is a quantity of carriers including the first grouping information and/or the second grouping information.

In a possible design, according to the foregoing method, the terminal device may determine the quantity of bits of the DAI field of the DCI and correctly receive DCI carried in a control resource set, to determine the quantity of bits of the HARQ-ACK feedback information and determine a transmit power of a PUCCH based on the quantity of bits of the HARQ-ACK feedback information; or determine an offset of a transmit power of a PUCCH based on the quantity of bits of the HARQ-ACK feedback information and determine the transmit power of the PUCCH based on the offset. The terminal device sends the HARQ-ACK feedback information with the corresponding quantity of bits based on the transmit power of the PUCCH.

In other words, the terminal device may determine the offset of the transmit power of the PUCCH based on the first indication information, the second indication information, and the HARQ-ACK feedback mode indication information. Specifically, if the PUCCH has an uplink activation BWP number b in a carrier number f in a serving cell number c and a sending occasion number in which the PUCCH is located is i, the transmit power $P_{PUCCH,b,f,c}(i, q_u, q_d, l)$ of PUCCH is defined as:

$$P_{PUCCH,b,f,c}(i, q_u, q_d, l) = \min\left\{\begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i,l) \end{array}\right\}.$$

$P_{CMAX, f,c}(i)$ is a maximum transmit power, $P_{O\_PUCCH, b,f,c}(q_u)$ represents an open loop power value configured by the base station, $M_{RB, b,f,c}^{PUCCH}(i)$ represents a frequency domain resource occupied by the PUCCH, $PL_{b,f,c}(q_d)$ is a path loss estimation value determined by UE based on a downlink RS, $\Delta_{F\_PUCCH}(F)$ is a power adjustment value determined based on the PUCCH, $\Delta_{TF,b,f,c}(i)=10\log_{10}(K_1 \cdot (n_{HARQ-ACK}(i)+O_{SR}(i)+O_{CSI}(i))/N_{RE}(i))$ is a power adjustment value determined based on a quantity of bits carried on the PUCCH, and $g_{b,f,c}(i,l)$ represents a current power control adjustment value of the PUCCH and is usually indicated by the base station by using DCI.

$$n_{HARQ-ACK} = n_{HARQ-ACK,TB} = \left(\left(V_{DAI,m_{last}}^{DL} - \sum_{c=0}^{N_{cells}^{DL}-1} U_{DAI,c}\right) \bmod 4\right) N_{TB,max}^{DL} +$$

$$\sum_{c=0}^{N_{cells}^{DL}-1}\left(\sum_{m=0}^{M-1} N_{m,c}^{received} + N_{SPS,c}\right), \text{ or}$$

$$n_{HARQ-ACK} = n_{HARQ-ACK,CBG} = \left(\left(V_{DAI,m_{last}}^{DL} - \sum_{c=0}^{N_{cells}^{DL,CBG}-1} U_{DAI,c}^{CBG}\right) \bmod 4\right)$$

$$N_{HARQ-ACK,max}^{CBG/TB,max} + \sum_{c=0}^{N_{cells}^{DL}-1}\sum_{m=0}^{M-1} N_{m,c}^{received,CBG}.$$

$n_{HARQ-ACK}$ represents a quantity of HARQ-ACK bits that the terminal device determines to transmit on the PUCCH, $n_{HARQ-ACK,TB}$ represents a quantity of serving cells or carriers using a HARQ-ACK feedback mode based on a transport block, $V_{DAI,m_{last}}^{DL}$ represents that a plurality of pieces of DCI for scheduling the PUCCH are located on the last detection occasion or a value indicated by a counter DAI included in a DCI sending moment, $$\sum_{c=0}^{N_{cells}^{DL}-1} U_{DAI,c}$$

represents an amount of DCI that is detected by the terminal device on all carriers c and that is used to schedule downlink data, $N_{TB,max}^{DL}$ represents a maximum quantity codewords/transport blocks that may be indicated in DCI, $N_{cells}^{DL}$ represents a quantity of carriers configured by the base station for the terminal device, $N_{m,c}^{received}$ represents a quantity of transport blocks scheduled by DCI detected on a carrier c on a PDCCH detection occasion m, $N_{SPS,c}$ represents a quantity of semi-persistent (SPS) PDSCHs received on the carrier c, $n_{HARQ-ACK,CBG}$ represents that the terminal device determines a quantity of HARQ-ACK bits that are transmitted on the PUCCH and that are based on a CBG feedback mode, $$\sum_{c=0}^{N_{cells}^{DL,CBG}-1} U_{DAI,c}^{CBG}$$

represents an amount of DCI that is detected by the terminal device on all the carriers c and that is used to schedule downlink data based on the CBG feedback mode, $N_{cells}^{DL,CBG}$ represents a quantity of serving cells or carriers using a HARQ-ACK feedback mode based on a code block group (CBG), $N_{HARQ-ACK,max}^{CBG/TB,max}$ represents a maximum quantity of CBGs included in one TB, $$\sum_{c=0}^{N_{cells}^{DL}-1} \sum_{m=0}^{M-1} N_{m,c}^{received,CBG}$$

represents a quantity of CBGs scheduled by DCI detected on all carriers on 0 to M−1 PDCCH detection occasions, and mod represents modulo.

When a quantity of configured carriers is equal to 1 and at least one of the grouping information of the control resource set and the HARQ-ACK joint feedback mode, which are two higher layer parameters, is not configured, $V_{DAI,m_{last}}^{DL}$ is determined based on a value indicated by the counter DAI. When a quantity of configured carriers is equal to 1 and the grouping information of the control resource set and the HARQ-ACK joint feedback mode are both configured, or when a quantity of configured carriers is greater than 1, $V_{DAI,m_{last}}^{DL}$ is determined based on a value indicated by the total DAI.

According to another aspect, on the network device side, the network device may determine the quantity of bits of the DAI field of the DCI according to the method shown on the terminal device side. Therefore, the network device may determine the quantity of bits of the HARQ-ACK feedback information based on the quantity of bits of the DAI field, to determine the transmit power of the PUCCH based on the quantity of bits of the HARQ-ACK feedback information or determine the offset of the transmit power of the PUCCH based on the quantity of bits of the HARQ-ACK feedback information. The network device receives the HARQ-ACK feedback information by using the transmit power of the PUCCH.

In other words, the network device may determine the offset of the transmit power of the uplink signal based on the first indication information, the second indication information, and the HARQ-ACK feedback mode indication information. Specifically, a calculation manner for the offset of the transmit power is the same as the calculation manner shown on the terminal device side. Details are not described herein again.

In a possible embodiment, the network device sends the uplink signal based on the offset of the transmit power of the uplink signal.

The following describes, with reference to the accompanying drawings, apparatuses configured to implement the foregoing methods in embodiments of this application. Therefore, all the foregoing content may be used in the following embodiments. Repeated content is not described again.

Figure 8:
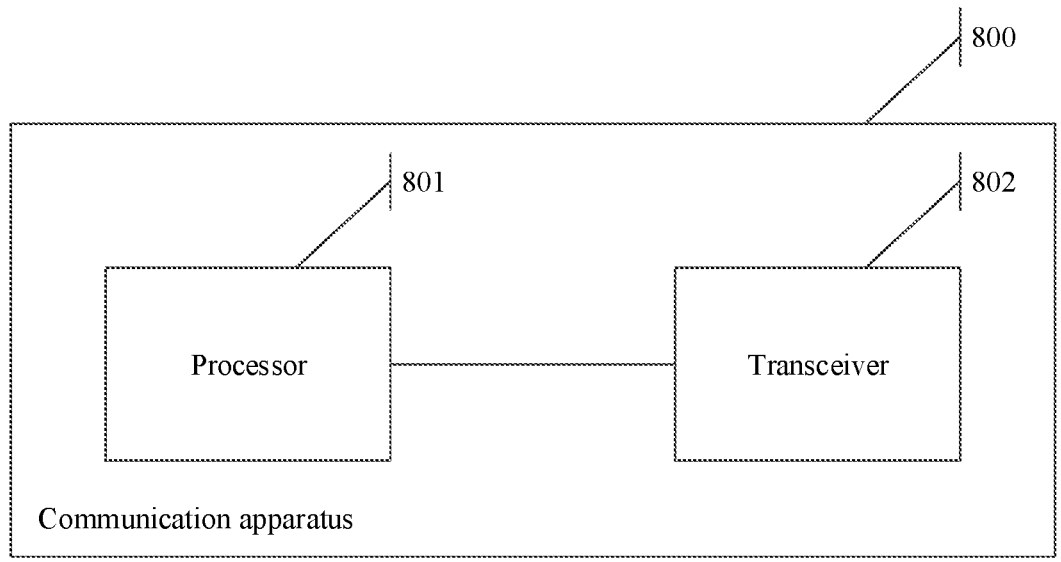
FIG. 8 is a schematic diagram of a structure of a communication apparatus according to an embodiment of this application.

FIG. 8 is a schematic diagram of a structure of a communication apparatus 800. The communication apparatus 800 may implement a function of the terminal device described above. The communication apparatus 800 may be the terminal device described above, or may be a chip disposed in the terminal device described above. The communication apparatus 800 may include a processor 801 and a transceiver 802. The processor 801 may be configured to: perform step 304 in the embodiment shown in FIG. 3 and/or support another process of the technology described in this specification, for example, may perform all or some of other processes performed by the terminal device other than the transceiver process in the foregoing descriptions. The transceiver 802 may be configured to: perform step 303 in the embodiment shown in FIG. 3 and/or support another process of technology described in this specification, for example, may perform all or some of the receiving and sending processes performed by the terminal device in the foregoing descriptions.

For example, the transceiver 802 is configured to receive first indication information sent by a network device, where the first indication information is used to indicate grouping information of N control resource sets in M control resource sets, N is less than M, and N and M are positive integers greater than or equal to 1.

The processor 801 is configured to determine grouping information of K control resource sets other than the N control resource sets in the M control resource sets based on the first indication information.

In a possible implementation, when the grouping information of the N control resource sets is the same, determining, by the terminal device, that the grouping information of the K control resource sets is the same as the grouping information of the N control resource sets; and/or In a possible implementation, when grouping information of at least two control resource sets in the N control resource sets is different, the terminal device determines that the grouping information of the K control resource sets is the same as grouping information of a first control resource set in the N control resource sets, where the grouping information of the first control resource set is a minimum value or a maximum value in the grouping information of the N control resource sets.

In a possible implementation, the M control resource sets belong to a same carrier or a same BWP.

In a possible implementation, when L control resource sets whose grouping information is indicated in a same carrier have same grouping information, the terminal device determines that grouping information of a control resource set whose grouping information is not indicated in the same carrier is the same as the grouping information of the L control resource sets.

In a possible implementation, when grouping information of at least two control resource sets in L control resource sets whose grouping information is indicated in a same carrier is different, the terminal device determines that grouping information of a control resource set whose grouping information is not indicated in the same carrier is the same as grouping information of a second control resource set, where L is less than N, L is a positive integer greater than or equal to 1, and the grouping information of the second control resource set is a minimum value or a maximum value in the grouping information of the L control resource sets.

In a possible design, the M control resource sets are control resource sets in a carrier configured by using RRC signaling or control resource sets in a carrier indicated and activated by using MAC CE signaling. In other words, the M control resource sets may all be control resource sets in an activated carrier; or some of the M control resource sets are control resource sets in an activated carrier, and the rest of the control resource sets are in an inactivated carrier.

In a possible embodiment, the terminal device receives second indication information, where the second indication information is used to indicate carrier information of the M control resource sets. The method further includes:

The terminal device determines a first quantity of carriers including first grouping information, where the first grouping information is any information in the grouping information of the M control resource sets. Then, the terminal device determines, based on the first quantity, a quantity of bits of a downlink assignment index DAI field of DCI carried in U control resource sets corresponding to the first grouping information, where U is less than M, and U and M are positive integers greater than or equal to 1.

In this embodiment of this application, when grouping information of control resource sets is defaulted, the terminal device can still determine, based on grouping information and carrier information of some or all of the control resource sets, a quantity of bits of a DAI field of DCI carried in the control resource sets, to ensure that the terminal device and the network device have consistent understanding for the quantity of bits of the DAI, thereby improving transmission reliability. The terminal device determines, only based on a quantity of carriers including same grouping information, a quantity of bits of DCI carried in a control resource set under the grouping information, thereby reducing DCI overheads.

In a possible embodiment, the first indication information and the second indication information may be carried in a same message or different messages.

In a possible embodiment, when the first quantity is greater than 1, the terminal device determines that the quantity of bits of the DAI field of the DCI carried in the U control resource sets is a first value; or when the first quantity is equal to 1, the terminal device determines that the quantity of bits of the DAI field of the DCI carried in the U control resource sets is a second value, where the first value is greater than the second value. For example, when a quantity of carriers including the first grouping information is 2, the terminal device determines that a quantity of bits of a total DAI field of DCI carried in a control resource set corresponding to the first grouping information is 2; or when a quantity of carriers including the first grouping information is 1, the terminal device determines that a quantity of bits of a total DAI field of DCI carried in a control resource set corresponding to the first grouping information is 0.

In a possible embodiment, the terminal device determines, based on the DAI, a quantity of bits of downlink data feedback information and a bit position of each piece of downlink data feedback information in a feedback information sequence. Specifically, the DAI may include a counter DAI. When the quantity of carriers is greater than 1, the DAI may further include a total DAI. The counter DAI is used to indicate an arrangement order of the DCI, so as to indicate a bit position of data scheduled by the DCI in the feedback information sequence. The total DAI is used to indicate an amount of DCI corresponding to currently existing to-be-fed-back data, so as to indicate a quantity of bits of the feedback information sequence.

In a possible embodiment, the terminal device detects, based on the quantity of bits of the DAI field of the DCI carried in the U control resource sets corresponding to the first grouping information, the DCI carried in the U control resource sets.

In a possible embodiment, the terminal device sends first feedback information of first downlink data, where the first downlink data is scheduled by DCI carried in at least one of the U control resource sets.

In a possible embodiment, the terminal device generates a first feedback information sequence based on DCI carried in at least one of the U control resource sets.

The terminal device determines, only based on a quantity of carriers including same grouping information, a quantity of bits of DCI carried in a control resource set under the grouping information, thereby reducing DCI overheads.

In a possible embodiment, the terminal device determines, based on the grouping information and the carrier information of the M control resource sets, a second quantity of carriers including second grouping information, where the second grouping information is any information in the grouping information of the M control resource sets, and the second grouping information is different from the first grouping information. The terminal device determines, based on the second quantity, a quantity of bits of a downlink assignment index DAI field of DCI carried in V control resource sets corresponding to the second grouping information, where V is less than M, and V is a positive integer greater than or equal to 1. The terminal device detects, based on the quantity of bits of the DAI field of the DCI carried in the V control resource sets corresponding to the second grouping information, the DCI carried in the V control resource sets.

In a possible embodiment, an uplink feedback resource of downlink data scheduled by the DCI carried in the U control resource sets is different from an uplink feedback resource of downlink data scheduled by the DCI carried in the V control resource sets in a same time unit.

In a possible embodiment, the terminal device sends second feedback information of second downlink data, where the second downlink data is scheduled by at least one piece of DCI carried in the V control resource sets.

In a possible embodiment, the first feedback information and the second feedback information are respectively carried on different uplink resources in a same time unit. Specifically, in one slot slot, the first feedback information and the second feedback information may be carried on two time division or frequency division PUCCH resources in the same slot.

In a possible embodiment, the terminal device determines HARQ-ACK feedback information corresponding to downlink data scheduled by DCI carried in control resource sets configured with same grouping information, generates a HARQ-ACK sequence, and determines an uplink resource occupied by the sequence. In addition, the terminal device separately generates HARQ-ACK sequences for HARQ-ACK feedback information corresponding to DCI carried in control resource sets configured with different grouping information, and determines an uplink resource occupied by each HARQ-ACK sequence.

In addition, the processor 801 of the communication apparatus shown in FIG. 8 may be configured to: perform step 504 to step 506 in the embodiment shown in FIG. 5 and/or support another process of the technology described in this specification, for example, may perform all or some of other processes performed by the terminal device other than the transceiver process in the foregoing descriptions. The transceiver 802 may be configured to: perform step 503 in the embodiment shown in FIG. 5 and/or support another process of the technology described in this specification, for example, may perform all or some of the receiving and sending processes performed by the terminal device in the foregoing descriptions.

For example, the transceiver 802 is configured to receive configuration information.

The processor 801 is configured to: determine, based on the configuration information, the grouping information of the M control resource sets; and then determine, based on the grouping information and the carrier information of the M control resource sets, a first quantity of carriers including first grouping information, where the first grouping information is any information in the grouping information of the M control resource sets. The terminal device determines, based on the quantity of carriers including the first grouping information, a quantity of bits of a DAI field of DCI carried in U control resource sets corresponding to the first grouping information, where U is less than M, and U and M are positive integers greater than or equal to 1.

In a possible embodiment, when the first quantity is greater than 1, the terminal device determines that the quantity of bits of the DAI field of the DCI carried in the U control resource sets is a first value; or when the first quantity is equal to 1, the terminal device determines that the quantity of bits of the DAI field of the DCI carried in the U control resource sets is a second value, where the first value is greater than the second value.

Figure 9:
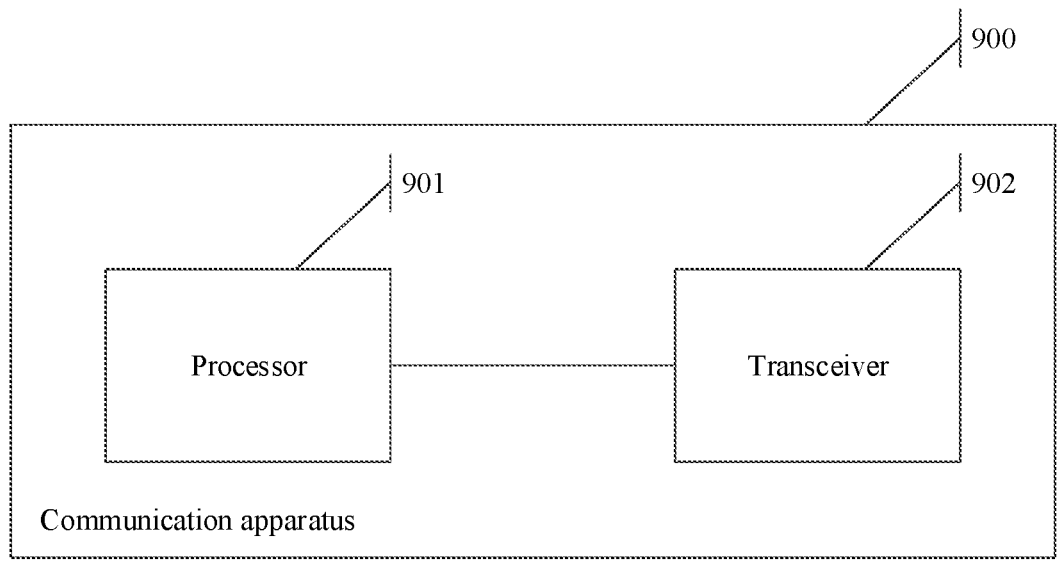
FIG. 9 is a schematic diagram of a structure of a communication apparatus according to an embodiment of this application.

FIG. 9 is a schematic diagram of a structure of a communication apparatus 900. The communication apparatus 900 may implement a function of the network device described above. The communication apparatus 900 may be the network device described above, or may be a chip disposed in the network device described above. The communication apparatus 900 may include a processor 901 and a transceiver 902. The processor 901 may be configured to perform step 301 in the embodiment shown in FIG. 3, and the transceiver 902 is configured to perform step 302 in the embodiment shown in FIG. 3.

In a possible implementation, when the grouping information of the N control resource sets is the same, the grouping information of the N control resource sets is the same as the grouping information of the K control resource sets.

In a possible implementation, when grouping information of at least two control resource sets in the N control resource sets is different, grouping information of a first control resource set in the N control resource sets is the same as the grouping information of the K control resource sets, where the grouping information of the first control resource set is a minimum value or a maximum value in the grouping information of the N control resource sets.

In a possible implementation, the M control resource sets belong to a same carrier or a same BWP.

In a possible implementation, when L control resource sets whose grouping information is indicated in a same carrier have same grouping information, the grouping information of the L control resource sets is the same as grouping information of a control resource set whose grouping information is not indicated in the same carrier.

In a possible implementation, when grouping information of at least two control resource sets in L control resource sets whose grouping information is indicated in a same carrier is different, grouping information of a second control resource set in the L control resource sets is the same as grouping information of a control resource set whose grouping information is not indicated in the same carrier, where L is less than N, and the grouping information of the second control resource set is a minimum value or a maximum value in the grouping information of the L control resource sets.

In a possible implementation, the M control resource sets are control resource sets in a carrier configured by using RRC signaling or MAC CE signaling.

In addition, the processor 901 of the communication apparatus shown in FIG. 9 may be configured to: perform step 501 in the embodiment shown in FIG. 5 or perform all or some other processes other than a transceiver process and/or support another process of the technology described in this specification, for example, may perform all or some of other processes performed by the terminal device other than the transceiver process in the foregoing descriptions. The transceiver 902 may be configured to: perform step 502 in the embodiment shown in FIG. 5 and/or support another process of the technology described in this specification, for example, may perform all or some of the receiving and sending processes performed by the terminal device in the foregoing descriptions.

For example, the processor 901 is configured to determine the M control resource sets.

The transceiver 902 is configured to send configuration information of the M control resource sets, where the configuration information includes the grouping information and the carrier information of the M control resource sets.

The processor 901 is further configured to determine a first quantity of carriers including first grouping information, where the first quantity is associated with the grouping information and the carrier information of the M control resource sets, the first grouping information is any information in the grouping information of the M control resource sets. The terminal device determines, based on the first quantity, a quantity of bits of a DAI field of DCI carried in U control resource sets corresponding to the first grouping information, where U is less than M, and U and M are positive integers greater than or equal to 1.

It may be understood that in embodiments of this application, that the first quantity is associated with the grouping information and the carrier information of the M control resource sets may specifically mean that the network device determines the first quantity based on the grouping information and the carrier information of the M control resource sets; or may mean that the network device first determines the first quantity, and then determines the grouping information and the carrier information of the M control resource sets based on the first quantity. An order or a cause and effect relationship is not specifically limited in embodiments of this application.

The transceiver 902 is further configured to send DCI to the terminal device.

In a possible implementation, when the first quantity is greater than 1, the network device determines that the quantity of bits of the DAI field of the DCI carried in the U control resource sets is a first value; or when the first quantity is equal to 1, the network device determines that the quantity of bits of the DAI field of the DCI carried in the U control resource sets is a second value, where the first value is greater than the second value.

All related content of the steps in the foregoing method embodiments may be cited in function descriptions of corresponding function modules. Details are not described herein again.

Figure 10:
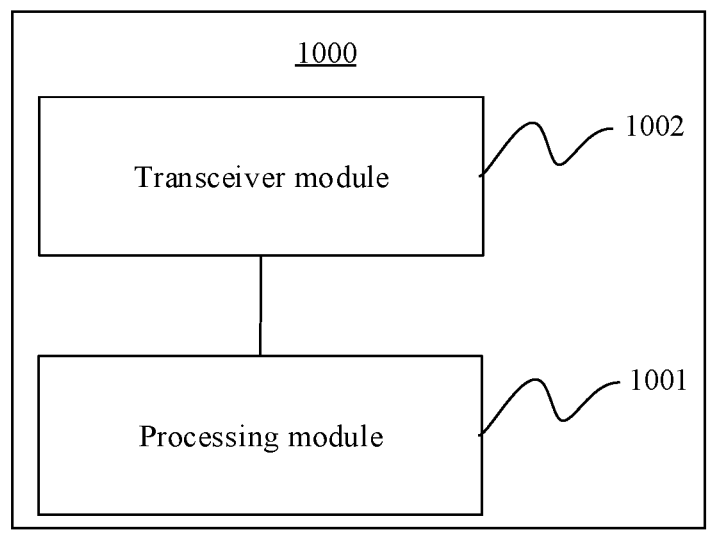
FIG. 10 is a schematic diagram of a structure of a communication apparatus according to an embodiment of this application.

In a possible embodiment, the transceiver 802 in FIG. 8 may be implemented by a transceiver module 1002 in FIG. 10, and the processor 801 in FIG. 8 may be implemented by a processing module 1001 in FIG. 10. Details are not described herein in this embodiment of this application again.

Figure 11:
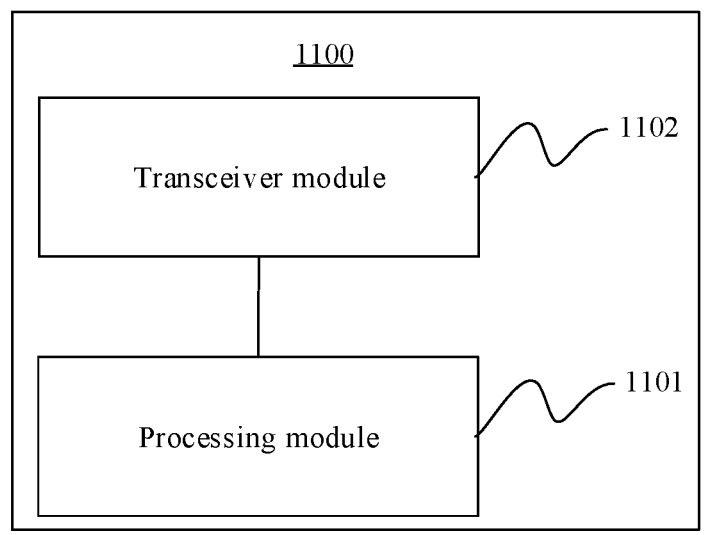
FIG. 11 is a schematic diagram of a structure of communication apparatus according to an embodiment of this application.

In a possible embodiment, the transceiver 902 in FIG. 9 may be implemented by a transceiver module 1102 in FIG. 11, and the processor 901 in FIG. 9 may be implemented by a processing module 1101 in FIG. 11. Details are not described herein in this embodiment of this application again.

Based on a same idea as the foregoing method embodiment, an embodiment of this application further provides a computer-readable storage medium. The computer-readable storage medium stores some instructions. When these instructions are invoked and executed by a computer, the computer is enabled to complete the method in any one of the foregoing method embodiment or the possible designs of the foregoing method embodiment. The computer-readable storage medium is not limited in this embodiment of this application. For example, the computer-readable storage medium may be a RAM (random-access memory) or a ROM (read-only memory).

Based on a same idea as the foregoing method embodiment, this application further provides a computer program product. When being invoked and executed by a computer, the computer program product can complete the method in any one of the foregoing method embodiment and the possible designs of the foregoing method embodiment.

Based on a same idea as the foregoing method embodiment, this application further provides a chip. The chip may include a processor and an interface circuit, to complete the method in any one of the foregoing method embodiment or the possible implementations of the foregoing method embodiment. "Couple" means that two components are directly or indirectly combined with each other. The combination may be fixed or movable, and the combination may allow communication of fluid, electricity, an electrical signal, or another type of signal between two components.

All or some of the foregoing embodiments may be implemented through software, hardware, firmware, or any combination thereof. When software is used for implementation, all or some of the foregoing embodiments may be implemented in a form of a computer program product. The computer program product includes one or more computer instructions. When the computer program instructions are loaded and executed on a computer, all or some of the procedures or functions according to embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operation steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although the present invention is described with reference to specific features and embodiments thereof, it is clear that various modifications and combinations may be made to them without departing from the scope of the present invention. Correspondingly, the specification and the accompanying drawings are merely examples of the present invention defined by the appended claims, and are considered as any of or all modifications, variations, combinations or equivalents that cover the scope of the present invention. It is clear that a person skilled in the art can make various modifications and variations to the present invention without departing from the spirit and scope of the present invention. The present invention is intended to cover these modifications and variations of the present invention provided that they fall within the scope of the claims of the present invention and their equivalent technologies.

What is claimed is:

1. A communication method, comprising:
   receiving, by a terminal device, first indication information, wherein the first indication information is used to indicate grouping information of N control resource sets in M control resource sets, grouping information of K control resource sets other than the N control resource sets in the M control resource sets is not indicated by the first indication information, N is less than M, N and K are positive integers greater than or equal to 1, and M is a positive integer greater than 1; and
   determining, by the terminal device, the grouping information of the K control resource sets other than the N control resource sets in the M control resource sets based on the first indication information.

2. The method according to claim 1, wherein determining, by the terminal device, the grouping information of the K control resource sets other than the N control resource sets in the M control resource sets based on the first indication information comprises at least one of:
   when the grouping information of the N control resource sets are the same, determining, by the terminal device, that the grouping information of the K control resource sets are the same as the grouping information of the N control resource sets; or
   when grouping information of at least two control resource sets in the N control resource sets are different, determining, by the terminal device, that the grouping information of the K control resource sets are the same as grouping information of a first control resource set in the N control resource sets, wherein the grouping information of the first control resource set is a minimum value or a maximum value in the grouping information of the N control resource sets.

3. The method according to claim 2, wherein the M control resource sets belong to a same carrier or a same bandwidth part (BWP).

4. The method according to claim 1, wherein determining, by the terminal device, the grouping information of the K control resource sets other than the N control resource sets in the M control resource sets based on the first indication information comprises at least one of:
   when L control resource sets whose grouping information are indicated in a same carrier have same grouping information, determining, by the terminal device, that grouping information of a control resource set whose grouping information is not indicated in the same carrier is the same as the grouping information of the L control resource sets; or
   when grouping information of at least two control resource sets in L control resource sets whose grouping information are indicated in a same carrier are different, determining, by the terminal device, that grouping information of a control resource set whose grouping information is not indicated in the same carrier is the same as grouping information of a second control resource set, wherein L is a positive integer greater than or equal to 1, the L control resource sets are some control resource sets in the N control resource sets, and the grouping information of the second control resource set is a minimum value or a maximum value in the grouping information of the L control resource sets.

5. The method according to claim 1, wherein the M control resource sets are control resource sets in a carrier configured by using radio resource control (RRC) signaling or media access control control element (MAC CE) signaling.

6. A communication method, comprising:
   determining, by a network device, M control resource sets, wherein M is a positive integer greater than 1; and
   sending, by the network device, first indication information to a terminal device, wherein the first indication information comprises grouping information of N control resource sets in the M control resource sets, grouping information of K control resource sets other than the N control resource sets in the M control resource sets is not comprised in the first indication information, N is less than M, and N and K are positive integers greater than or equal to 1, and wherein the grouping information of the N control resource sets are related to the grouping information of the K control resource sets other than the N control resource sets in the M control resource sets.

7. The method according to claim 6, wherein at least one of:
   when the grouping information of the N control resource sets are the same, the grouping information of the N control resource sets are the same as the grouping information of the K control resource sets; or
   when grouping information of at least two control resource sets in the N control resource sets are different, grouping information of a first control resource set in the N control resource sets are the same as the grouping information of the K control resource sets, wherein the grouping information of the first control resource set is a minimum value or a maximum value in the grouping information of the N control resource sets.

8. The method according to claim 7, wherein the M control resource sets belong to a same carrier or a same bandwidth part (BWP).

9. The method according to claim 6, wherein at least one of:
   when L control resource sets whose grouping information are indicated in a same carrier have same grouping information, the grouping information of the L control resource sets are the same as grouping information of a control resource set whose grouping information is not indicated in the same carrier; or
   when grouping information of at least two control resource sets in L control resource sets whose grouping information are indicated in a same carrier are different, grouping information of a second control resource set in the L control resource sets is the same as grouping information of a control resource set whose grouping information is not indicated in the same carrier, wherein L is a positive integer greater than or equal to 1, the L control resource sets are some control resource sets in the N control resource sets, and the grouping information of the second control resource set is a minimum value or a maximum value in the grouping information of the L control resource sets.

10. The method according to claim 6, wherein the M control resource sets are control resource sets in a carrier configured by using radio resource control (RRC) signaling or media access control control element (MAC CE) signaling.

11. A communication apparatus, comprising:
one or more processors; and
a memory, wherein the memory stores a computer program which, when executed by the one or more processors, causes the one or more processors to perform operations comprising:
receiving first indication information, wherein the first indication information is used to indicate grouping information of N control resource sets in M control resource sets, grouping information of K control resource sets other than the N control resource sets in the M control resource sets is not indicated by the first indication information, N is less than M, N and K are positive integers greater than or equal to 1, and M is a positive integer greater than 1; and
determining the grouping information of the K control resource sets other than the N control resource sets in the M control resource sets based on the first indication information.

12. The apparatus according to claim 11, wherein determining the grouping information of the K control resource sets other than the N control resource sets in the M control resource sets based on the first indication information comprises at least one of:
when the grouping information of the N control resource sets are the same, determining that the grouping information of the K control resource sets are the same as the grouping information of the N control resource sets; or
when grouping information of at least two control resource sets in the N control resource sets are different, determining that the grouping information of the K control resource sets are the same as grouping information of a first control resource set in the N control resource sets, wherein the grouping information of the first control resource set is a minimum value or a maximum value in the grouping information of the N control resource sets.

13. The apparatus according to claim 12, wherein the M control resource sets belong to a same carrier or a same bandwidth part (BWP).

14. The apparatus according to claim 11, wherein determining the grouping information of the K control resource sets other than the N control resource sets in the M control resource sets based on the first indication information comprises at least one of:
when L control resource sets whose grouping information are indicated in a same carrier have same grouping information, determining that grouping information of a control resource set whose grouping information is not indicated in the same carrier is the same as the grouping information of the L control resource sets; or
when grouping information of at least two control resource sets in L control resource sets whose grouping information are indicated in a same carrier are different, determining that grouping information of a control resource set whose grouping information is not indicated in the same carrier is the same as grouping information of a second control resource set, wherein L is a positive integer greater than or equal to 1, the L control resource sets are some control resource sets in the N control resource sets, and the grouping information of the second control resource set is a minimum value or a maximum value in the grouping information of the L control resource sets.

15. The apparatus according to claim 11, wherein the M control resource sets are control resource sets in a carrier configured by using radio resource control (RRC) signaling or media access control control element (MAC CE) signaling.

16. A communication apparatus, comprising:
one or more processors; and
a memory, wherein the memory stores a computer program which, when executed by the one or more processors, causes the one or more processors to perform operations comprising:
determining M control resource sets, wherein M is a positive integer greater than 1; and
sending first indication information to a terminal device, wherein the first indication information comprises grouping information of N control resource sets in the M control resource sets, grouping information of K control resource sets other than the N control resource sets in the M control resource sets is not comprised in the first indication information, N is less than M, and N and K are positive integers greater than or equal to 1, and wherein the grouping information of the N control resource sets are related to the grouping information of the K control resource sets other than the N control resource sets in the M control resource sets.

17. The apparatus according to claim 16, wherein at least one of:
when the grouping information of the N control resource sets are the same, the grouping information of the N control resource sets are the same as the grouping information of the K control resource sets; or
when grouping information of at least two control resource sets in the N control resource sets are different, grouping information of a first control resource set in the N control resource sets are the same as the grouping information of the K control resource sets, wherein the grouping information of the first control resource set is a minimum value or a maximum value in the grouping information of the N control resource sets.

18. The apparatus according to claim 17, wherein the M control resource sets belong to a same carrier or a same bandwidth part (BWP).

19. The apparatus according to claim 16, wherein at least one of:
when L control resource sets whose grouping information are indicated in a same carrier have same grouping information, the grouping information of the L control resource sets are the same as grouping information of a control resource set whose grouping information is not indicated in the same carrier; or
when grouping information of at least two control resource sets in L control resource sets whose grouping information are indicated in a same carrier are different, grouping information of a second control resource set in the L control resource sets is the same as grouping information of a control resource set whose grouping information is not indicated in the same carrier, wherein L is a positive integer greater than or equal to 1, the L control resource sets are some control resource sets in the N control resource sets, and the grouping information of the second control resource set is a minimum value or a maximum value in the grouping information of the L control resource sets.

20. The apparatus according to claim 16, wherein the M control resource sets are control resource sets in a carrier configured by using radio resource control (RRC) signaling or media access control control element (MAC CE) signaling.

* * * * *

UNITED STATES PATENT AND TRADEMARK OFFICE
CERTIFICATE OF CORRECTION

Page 1 of 1

PATENT NO. : 12,261,801 B2
APPLICATION NO. : 17/721495
DATED : March 25, 2025
INVENTOR(S) : Xianda Liu and Kunpeng Liu It is certified that error appears in the above-identified patent and that said Letters Patent is hereby corrected as shown below:

On the Title Page

In Column 1 item (30) (Foreign Application Priority Data), In Line 1, delete "(WO)" and insert -- (CN) --.

In the Claims

In Column 43, In Line 60, In Claim 14, delete "Lis" and insert -- L is --.

Signed and Sealed this
Twenty-second Day of July, 2025

Coke Morgan Stewart
*Acting Director of the United States Patent and Trademark Office*